United States Patent
Kasahara et al.

(10) Patent No.: US 8,717,171 B2
(45) Date of Patent: May 6, 2014

(54) DEVICE FOR DETECTING ENTRY AND/OR EXIT, MONITORING DEVICE, AND METHOD FOR DETECTING ENTRY AND/OR EXIT INCLUDING A POSSIBLE EXISTING REGION

(75) Inventors: Hiroshi Kasahara, Osaka (JP); Masahiro Ooho, Saitama (JP); Masataka Sugiura, Tokyo (JP); Mikio Morioka, Fukuoka (JP)

(73) Assignee: Panasonic Corporation, Osaka (JP)

( * ) Notice: Subject to any disclaimer, the term of this patent is extended or adjusted under 35 U.S.C. 154(b) by 356 days.

(21) Appl. No.: 13/254,963

(22) PCT Filed: Oct. 15, 2009

(86) PCT No.: PCT/JP2009/005379
§ 371 (c)(1),
(2), (4) Date: Sep. 6, 2011

(87) PCT Pub. No.: WO2010/103584
PCT Pub. Date: Sep. 16, 2010

(65) Prior Publication Data
US 2011/0316700 A1    Dec. 29, 2011

(30) Foreign Application Priority Data
Mar. 9, 2009 (JP) .................................. 2009-055591

(51) Int. Cl.
*G08B 21/00* (2006.01)
(52) U.S. Cl.
USPC ........................ 340/541; 340/539.13; 340/5.2
(58) Field of Classification Search
USPC ...................... 340/541–567, 539.13, 5.2, 5.7
See application file for complete search history.

(56) References Cited

U.S. PATENT DOCUMENTS

| | | |
|---|---|---|
| 2004/0227816 A1 | 11/2004 | Sato et al. |
| 2004/0236466 A1 | 11/2004 | Ota et al. |
| 2005/0196017 A1 | 9/2005 | Altherr et al. |

FOREIGN PATENT DOCUMENTS

| | | |
|---|---|---|
| JP | 2659666 | 9/1997 |
| JP | 11-203567 | 7/1999 |
| JP | 2000-155863 | 6/2000 |
| JP | 2000-295600 | 10/2000 |
| JP | 2003-51083 | 2/2003 |
| JP | 2004-212199 | 7/2004 |
| JP | 2004-276154 | 10/2004 |
| JP | 2005-250989 | 9/2005 |
| JP | 2006-138088 | 6/2006 |
| JP | 2006-188853 | 7/2006 |
| JP | 2008-47074 | 2/2008 |

OTHER PUBLICATIONS

"Automatic extraction of moving object in video sequences", J Tsinghua Univ (Sci & Tech), 2001, vol. 41, No. 4/5, pp. 190-193, along with an English language translation thereof.

*Primary Examiner* — Jeffery Hofsass
(74) *Attorney, Agent, or Firm* — Greenblum & Bernstein, P.L.C.

(57) ABSTRACT

A reliability extracting section extracts the reliability of positioning at a person's position calculator on the basis of an image captured from an imaging section. A section that creates a possibly-existing area determines a possibly-existing area on the basis of the result of positioning obtained by the person's position calculator and reliability (precision of positioning) obtained by the reliability extracting section. An entry determining section determines entering and/or leaving to/from a targeted monitored area on the basis of the overlapping of the possibly-existing area with the monitored area.

15 Claims, 27 Drawing Sheets

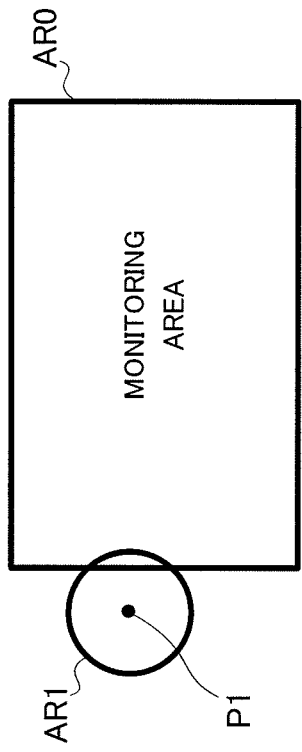
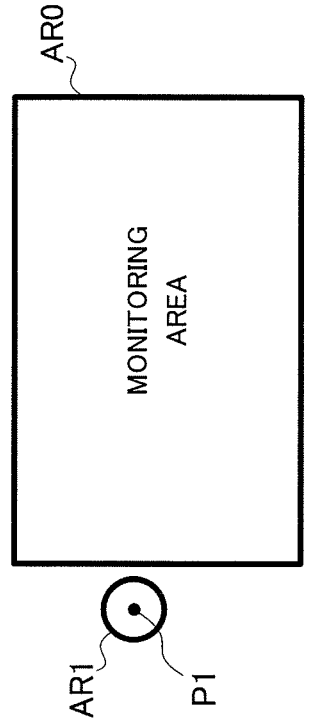
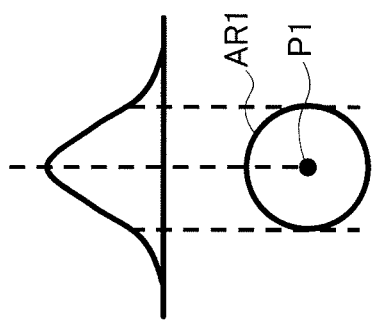
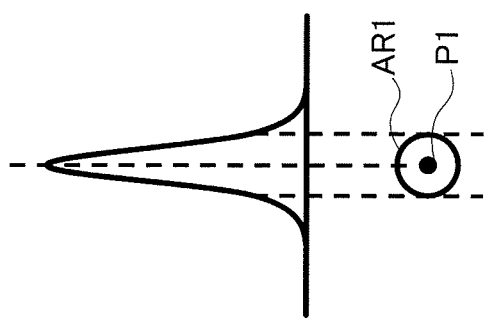

| PERSON ID | DETECTING TIME | PERSON POSITION | RELIABILITY (PROBABILITY DENSITY FUNCTION) |
|---|---|---|---|
| 001 | 15:23:42 | x=727 y=711 | $f_1(x, y)$ |
| 003 | 15:53:18 | x=727 y=711 | $f_2(x, y)$ |

FIG.7

| No. | x-AXIS DIRECTION | y-AXIS DIRECTION |
|---|---|---|
| 1 | $750 \leq x \leq 850$ | $690 \leq y \leq 800$ |
| 2 | $430 \leq x \leq 520$ | $870 \leq y \leq 960$ |

| PERSON ID | DETECTING TIME | PERSON POSITION | RELIABILITY (PROBABILITY DENSITY FUNCTION) |
|---|---|---|---|
| 001 | 15:23:42 | x=727 y=711 | $f_1(x, y)$ |

FIG.17B

| PERSON ID | DETECTING TIME | PERSON POSITION | RELIABILITY (PROBABILITY DENSITY FUNCTION) |
|---|---|---|---|
| 004 | 15:23:42 | x=851 y=721 | $g_1(x, y)$ |
| 004 | 15:23:40 | x=916 y=743 | $g_2(x, y)$ |

FIG.17C

| PERSON ID | DETECTING TIME | PERSON POSITION | RELIABILITY (PROBABILITY DENSITY FUNCTION) |
|---|---|---|---|
| 004 | 15:23:42 | x=851 y=721 | $h_1(x, y)$ |
| 004 | 15:23:40 | x=804 y=765 | $h_2(x, y)$ |

FIG.17D

| No. | x-AXIS DIRECTION | y-AXIS DIRECTION |
|---|---|---|
| 1 | 720～950 | 700～850 |

FIG.24A

| PERSON ID | DETECTING TIME | PERSON POSITION | RELIABILITY (PROBABILITY DENSITY FUNCTION) |
|---|---|---|---|
| 001 | 15:23:42 | x=727 y=711 | $f_1(x, y)$ |
| 001 | 15:23:38 | x=853 y=673 | $f_2(x, y)$ |

FIG.24B

| PERSON ID | DETECTING TIME | PERSON POSITION | RELIABILITY (PROBABILITY DENSITY FUNCTION) |
|---|---|---|---|
| 004 | 15:23:42 | x=701 y=695 | $g_1(x, y)$ |
| 004 | 15:23:40 | x=829 y=683 | $g_2(x, y)$ |

FIG.24C

| PERSON ID | DETECTING TIME | PERSON POSITION | RELIABILITY (PROBABILITY DENSITY FUNCTION) |
|---|---|---|---|
| 004 | 15:23:42 | x=701 y=695 | $h_1(x, y)$ |
| 004 | 15:23:40 | x=592 y=601 | $h_2(x, y)$ |

FIG.24D

| No. | x-AXIS DIRECTION | y-AXIS DIRECTION |
|---|---|---|
| 1 | 720~950 | 700~850 |

FIG.30A

| PERSON ID | DETECTING TIME | PERSON POSITION | RELIABILITY (PROBABILITY DENSITY FUNCTION) |
|---|---|---|---|
| 001 | 15:23:42 | x=727 y=711 | $f_1(x, y)$ |
| 001 | 15:23:41 | x=673 y=754 | $f_2(x, y)$ |
| 001 | 15:23:40 | x=601 y=813 | $f_3(x, y)$ |

FIG.30B

| PERSON ID | DETECTING TIME | PERSON POSITION | RELIABILITY (PROBABILITY DENSITY FUNCTION) |
|---|---|---|---|
| 004 | 15:23:42 | x=701 y=654 | $g_1(x, y)$ |
| 004 | 15:23:41 | x=768 y=602 | $g_2(x, y)$ |
| 004 | 15:23:40 | x=834 y=536 | $g_3(x, y)$ |

FIG.30C

| PERSON ID | DETECTING TIME | PERSON POSITION | RELIABILITY (PROBABILITY DENSITY FUNCTION) |
|---|---|---|---|
| 004 | 15:23:42 | x=701 y=654 | $h_1(x, y)$ |
| 004 | 15:23:41 | x=722 y=581 | $h_2(x, y)$ |
| 004 | 15:23:40 | x=734 y=496 | $h_3(x, y)$ |

FIG.30D

| No. | x-AXIS DIRECTION | y-AXIS DIRECTION |
|---|---|---|
| 1 | 720 ~ 950 | 700 ~ 850 |

DEVICE FOR DETECTING ENTRY AND/OR EXIT, MONITORING DEVICE, AND METHOD FOR DETECTING ENTRY AND/OR EXIT INCLUDING A POSSIBLE EXISTING REGION

TECHNICAL FIELD

The present invention relates to an apparatus for detecting entering and/or leaving, a monitoring apparatus and a method for detecting entering and/or leaving and to a technique for detecting entering and/or leaving (that is, entering/leaving) of a target into and/or from a specific area.

BACKGROUND ART

Conventionally, there are proposed a large number of apparatuses for detecting entering and/or leaving of a target such as a person into and/or from a specific area such as a security area.

The apparatus of this type is roughly divided into two parts. The apparatus of a first type serves to detect entering and/or leaving of a person into and/or from a specific area provided with a locking apparatus, an entry door and/or a gate. The apparatus of a second type can also detect entering and/or leaving of a person into and/or from a so-called open specific area (which will be hereinafter referred to as an open area) which is not provided with a locking apparatus, an entry door and/or a gate.

Patent literature 1, patent literature 2, patent literature 3 and the like disclose an example of the apparatus of the first type. Moreover, patent literature 4, patent literature 5 and the like disclose an example of the apparatus of the second type.

The apparatus of the second type has an advantage that an application range is wider than that in the apparatus of the first type in that it can also be applied to the open area which is not provided with the locking apparatus, entering/leaving and/or the gate.

Patent literature 4 discloses an apparatus for detecting a person by means of a monitoring camera and deciding whether or not a suspicious person enters a specific area based on a position of the detected person, a position of the specific area and a staying duration of the person.

Patent literature 5 discloses an apparatus for deciding whether a portable terminal (a person) exists an inside of a specific area or an outside of the specific area based on a relative positional relationship between a result of a position measurement of the portable terminal and a boundary of the specific area.

CITATION LIST

Patent Literature

PTL 1
Japanese Patent Application Laid-Open No. 2006-138088
PTL 2
Japanese Patent Application Laid-Open No. 2000-155863
PTL 3
Japanese Patent Application Laid-Open No. 2006-188853
PTL 4
Japanese Patent Application Laid-Open No. 2008-047074
PTL 5
Japanese Patent Application Laid-Open No. 2004-212199

SUMMARY OF INVENTION

Technical Problem

However, the prior art is still insufficient for precisely deciding entering and/or leaving of a person into and/or from an open area.

For example, the technique disclosed in patent literature 4 has a disadvantage that an error made in a detecting position for a person by means of a monitoring camera directly causes a false decision if any.

Moreover, the technique disclosed in patent literature 5 describes a method for deciding entering and/or leaving which takes a position measurement error into consideration. However, entering and/or leaving decision disclosed in patent literature 5 prevents a result of the decision in which entering and leaving are repetitively carried out due to the position measurement error though a portable terminal (a person) is continuously stopping in the vicinity of a boundary of an area, and does not fundamentally enhance precision in a detection of entering and/or leaving, for example.

The precision in the detection implies that it is possible to detect entering and/or leaving which meets a demand of a monitor, for example, a demand for decreasing a detection failure (a false negative) or a demand for decreasing an erroneous detection (a false positive).

It is therefore an object of the invention to provide an apparatus for detecting entering and/or leaving, a monitoring apparatus and a method for detecting entering and/or leaving which can detect entering and/or leaving of a detecting target into and/or from a specific area with high precision also in the case in which a position measurement error is made.

Solution to Problem

A first aspect of an apparatus for detecting entering and/or leaving according to the invention employs a structure including a position measurement reliability detecting section that detects a position measurement reliability of a position measuring section; a possible existing region determining section that determines a possible existing region in which a target subjected to a position measurement by the position measuring section might exist based on a result of the position measurement which is obtained by the position measuring section and the position measurement reliability obtained by the position measurement reliability detecting section; and a deciding section that decides entering and/or leaving of the target into and/or from a specific area based on an overlap of the possible existing region and the specific area.

A first aspect of a monitoring apparatus according to the invention employs a structure including the apparatus for detecting entering and/or leaving; an warning output section which outputs an warning based on a result of a decision obtained by the deciding section; a visible region forming section that obtains a visible region of the target; and an warning necessity deciding section that does not cause the warning output section to output an warning for a first target when a position measuring position of the first target is included in a visible region of a second target to be a separate target from the first target even if it is decided that the first target enters the specific area by the deciding section.

Advantageous Effects of Invention

According to the invention, it is possible to detect entering and/or leaving of a detecting target into and/or from a specific area with high precision also in the case in which a position measurement error is made.

BRIEF DESCRIPTION OF THE DRAWINGS

FIG. 5A-1 is a chart showing a possible existing region which is set when a reliability of a position measurement is low, FIG. 5B-1 is a chart showing a possible existing region which is set when the reliability of the position measurement is high, FIGS. 5A-2 and 5B-2 are diagrams showing a state in which an overlap with a monitoring area is caused or is not caused depending on a difference in the reliability of the position measurement even if a position of a position measuring point is the same;

FIG. 7 is a table showing an example of a person position and reliability;

FIG. 8 is a table showing an example of monitoring area information to be stored in monitoring area DB;

FIG. 17A is a table showing an example of a person position and a reliability for an invader having no entry authority, FIG. 17B is a table showing a first example of a person position and a reliability for a person having an entry authority, FIG. 17C is a table showing a second example of the person position and the reliability for the person having the entry authority, and FIG. 17D is a table showing an example of monitoring area information to be stored in monitoring area DB;

FIG. 24A is a table showing an example of a person position and a reliability for an invader having no entry authority, FIG. 24B is a table showing a first example of a person position and a reliability for a person having an entry authority, FIG. 24C is a table showing a second example of the person position and the reliability for the person having the entry authority, and FIG. 24D is a table showing an example of monitoring area information to be stored in monitoring area DB;

FIG. 30A is a table showing an example of a person position and a reliability for an invader having no entry authority, FIG. 30B is a table showing a first example of a person position and a reliability for a person having an entry authority, FIG. 30C is a table showing a second example of the person position and the reliability for the person having the entry authority, and FIG. 30D is a table showing an example of monitoring area information to be stored in monitoring area DB.

DESCRIPTION OF EMBODIMENTS

Embodiments according to the invention will be described below in detail with reference to the drawings.

[Embodiment 1]

[1] Principle

First of all, the circumstances in which the invention has been made and the principle of the embodiment will be described before explanation of the embodiments.

The inventors of the invention paid attention to the fact that a reliability for a result of a position measurement is varied due to a difference in a position measuring environment or the like also in the case in which the same result of the position measurement is obtained.

For example, in the case in which a position measurement for a person is carried out by using a person image recognition, a situation of an occlusion (concealment) of persons or the degree of matching with a person template are varied every position measurement. Therefore, a position measurement error also takes a different value each time so that a reliability for a result of the position measurement is also changed.

In the case in which a position measurement for a person is carried out by using a wireless apparatus such as a wireless tag, moreover, a position measuring environment is varied every position measurement by an influence of a wave absorber such as a human body containing a large quantity of moisture or a conductor such as a metal. Therefore, a position measurement error also takes a value varied each time so that a reliability for a result of the position measurement is also changed.

In the invention, therefore, there is set a possible existing region of a target on which a reliability for a result of a position measurement is reflected, and entering and/or leaving of a target into and/or from a specific area are/is decided based on an overlapping state of the possible existing region and the specific area. Also in the case in which a position measurement error is made, consequently, it is possible to detect entering and/or leaving of a detecting target into and/or from a specific area with high precision.

Figure 1:
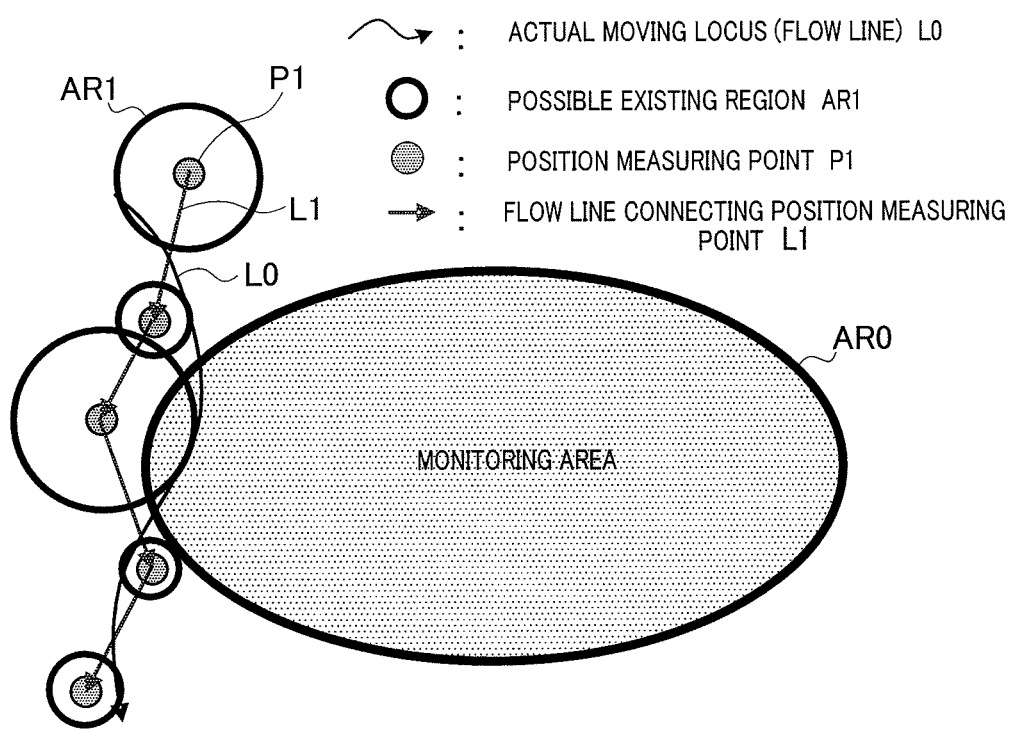
FIG. 1 is a diagram showing an image of a detection of entering and/or leaving according to Embodiment 1.

FIG. 1 shows an image for a detection of entering and/or leaving according to the embodiment.

A black circle indicated as the reference symbol P1 denotes a position measuring point to be a result of a position measurement of a target. A circle having position measuring point P1 as a center which is indicated as the reference symbol AR1 denotes a possible existing region for a target. Moreover, the reference symbol L0 indicates a flow line to be an actual moving locus of the target, and the reference symbol L1 indicates a flow line connecting position measuring points P1 at a plurality of times.

Possible existing region AR1 is a smaller circle with an increase in a reliability for a result of a position measurement, and conversely, is a larger circle with a reduction in the reliability for the result of the position measurement.

In the embodiment, any of the following decisions (i) to (vi) is carried out. Thus, it is decided that a target enters monitoring area (specific area) AR0.

(i) If a part of single possible existing region AR1 overlaps with monitoring area AR0, it is decided that the target enters monitoring area AR0.

(ii) If an area of a portion in which single possible existing region AR1 overlaps with monitoring area AR0 is equal to or larger than a threshold, it is decided that the target enters monitoring area AR0.

(iii) Possible existing region AR1 is defined as a probability density, and it is decided that the target enters monitoring area AR0 if an integrated value (a cumulative probability density) of a probability density of a portion in which single possible existing region AR1 overlaps with monitoring area AR0 is equal to or greater than a threshold.

(iv) If the number of times a part of possible existing region AR1 overlaps with monitoring area AR0 in respect of a plurality of position measuring points P1 for a predetermined period is equal to or larger than a threshold, it is decided that the target enters monitoring area AR0.

(v) If a sum of areas of the portions in which possible existing region AR1 overlaps with monitoring area AR0 at a plurality of position measuring points P1 for a predetermined period is equal to or greater than a threshold, it is decided that the target enters monitoring area AR0.

(vi) Possible existing region AR1 is defined as a probability density, and it is decided that the target enters monitoring area AR0 if a sum of integrated values of the probability densities of the portions in which possible existing region AR1 overlaps with monitoring area AR0 at a plurality of continuous position measuring points P1 for a predetermined period is equal to or greater than a threshold.

It is also possible to select any of the methods (i) to (vi) which is to be used depending on a relationship between a calculating resource and a calculating cost (a quantity of a calculation or a time required for a calculation), the degree of precision or immediacy which is required for deciding entering and/or leaving, or the like.

Since (i) is the simplest and has the smallest calculation cost, it is optimum in the case in which hardware having a small calculation resource is used to constitute an apparatus. However, it is decided that entering is carried out even if the possible existing region slightly overlaps with the monitoring area. Referring to the method (i), thus, it is decided that entering is carried out even if a probability of existence in the monitoring area is low. For this reason, the method (i) has lower precision in the decision than the other methods.

As compared with (i), (ii) has an advantage that it is possible to easily vary the precision in the decision of entering and/or leaving with a change in the threshold. However, it is necessary to carry out a calculation for obtaining an area. As compared with (ii), (iii) has an advantage that it is possible to obtain more accurate precision in the decision of entering and/or leaving based on a existence probability. However, it is necessary to carry out a complicated integrating calculation related to a probability density distribution function. Accordingly, it is preferable to determine any of (i), (ii) and (iii) which is to be used with a trade-off between the quantity of a calculation or the time required for a calculation and the decision precision.

As compared with (i), (ii) and (iii), moreover, (iv), (v) and (vi) have an advantage that the precision in the decision of entering and/or leaving is enhanced because they use a plurality of position measuring points respectively. However, a long time is required for collecting a plurality of position measuring point data. For this reason, it is preferable to determine any of the deciding methods which is to be used depending on whether a decision for an immediacy is required or not.

Furthermore, it is preferable to select the deciding method or the threshold depending on the required precision in the detection in the following manner.

In the case in which a detection failure (a false negative) caused by the precision in the detection is to be deceased, it is preferable to use (i) or to set the thresholds of (ii) to (vi) to be rather low. Consequently, also in the case in which the result of the position measurement has an error and position measuring point P1 is detected on the outside of the monitoring area though the entrance into monitoring area AR0 is carried out, actually, possible existing region AR1 taking an error into consideration is included in monitoring area AR0. Therefore, it is possible to prevent a detection failure.

In the case in which an erroneous detection (a false positive) is to be decreased, it is preferable to set the thresholds of (ii) to (vi) to be rather great. Consequently, also in the case in which the result of the position measurement has an error and position measuring point P1 is detected on an inside of the monitoring area though an entry into monitoring area AR0 is not carried out, actually, possible existing region AR1 taking an error into consideration does not exceed a certain area (an integrated value) in monitoring area AR0. Therefore, it is possible to prevent an erroneous detection.

When the overlap of monitoring area AR0 and possible existing region AR1 in (ii) is to be utilized as a specific threshold, for example, an overlapping portion of an area is 0.5 (a slight shift might be caused depending on a shape of the monitoring area) in case of a position measuring point on a boundary line of monitoring area AR0 if the threshold is set to be 0.5. Thus, there is obtained precision in a detection which is almost equivalent to that in the case in which only the position measuring point is used according to the related art. When the detection failure is to be decreased, the threshold is set to be 0.01, for example. Consequently, it is possible to decide that entering is carried out including the case in which entering into monitoring area AR0 might be performed in consideration of an error. In the case in which the erroneous detection is to be decreased, moreover, the threshold is set to be 0.99, for example. Consequently, it is possible to decide that the entrance is carried out only in the case in which entering into monitoring area AR0 is surely performed in consideration of an error.

Figure 2:
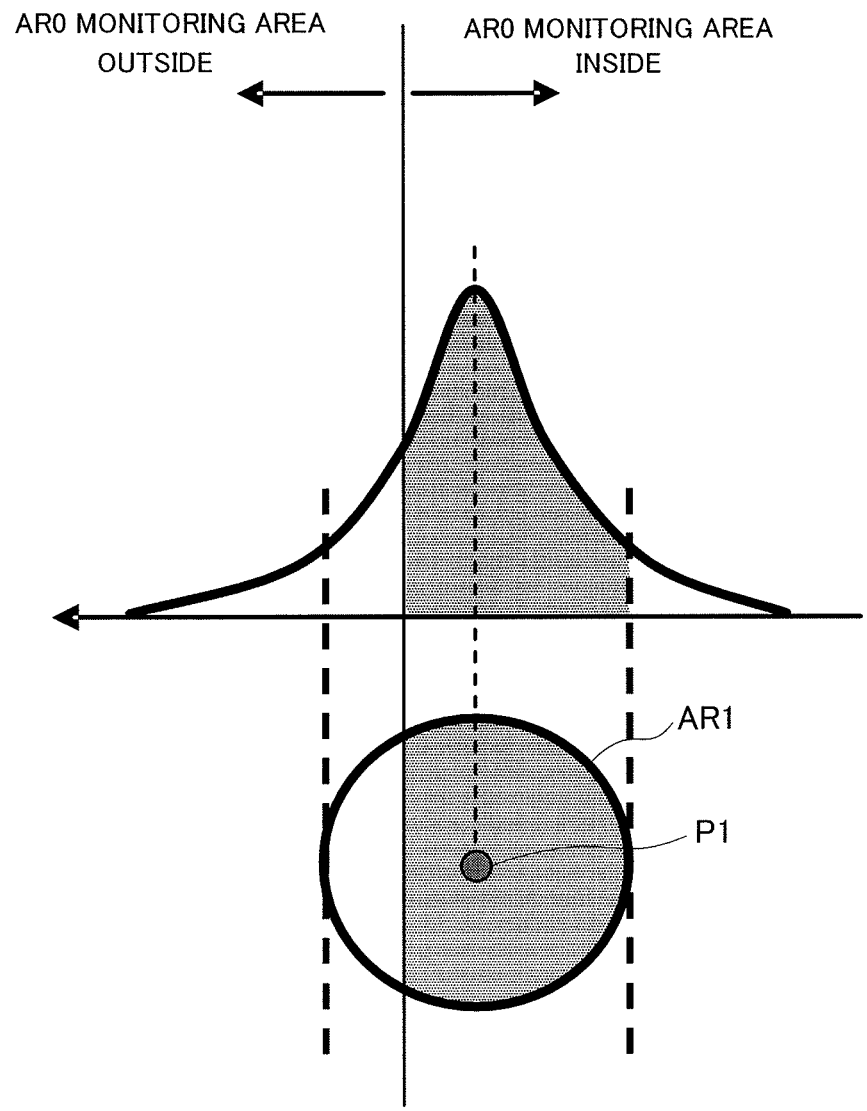
FIG. 2 is a chart for explaining an area of a portion in which a possible existing region and a monitoring area overlap with each other, and an integrated value of a probability density of the portion in which the possible existing region and the monitoring area overlap with each other.

The area of the portion in which possible existing region AR1 and monitoring area AR0 overlap with each other indicates an area shown in shading at a lower side of FIG. 2 (an area in monitoring area AR0 of possible existing region AR1). The integrated value of the probability density of the portion in which possible existing region AR1 and monitoring area AR0 overlap with each other indicates a value obtained by integrating a probability density of a portion shown in shading at an upper side of FIG. 2 with respect to the portion in which possible existing region AR1 and monitoring area AR0 overlap with each other.

Figure 3:
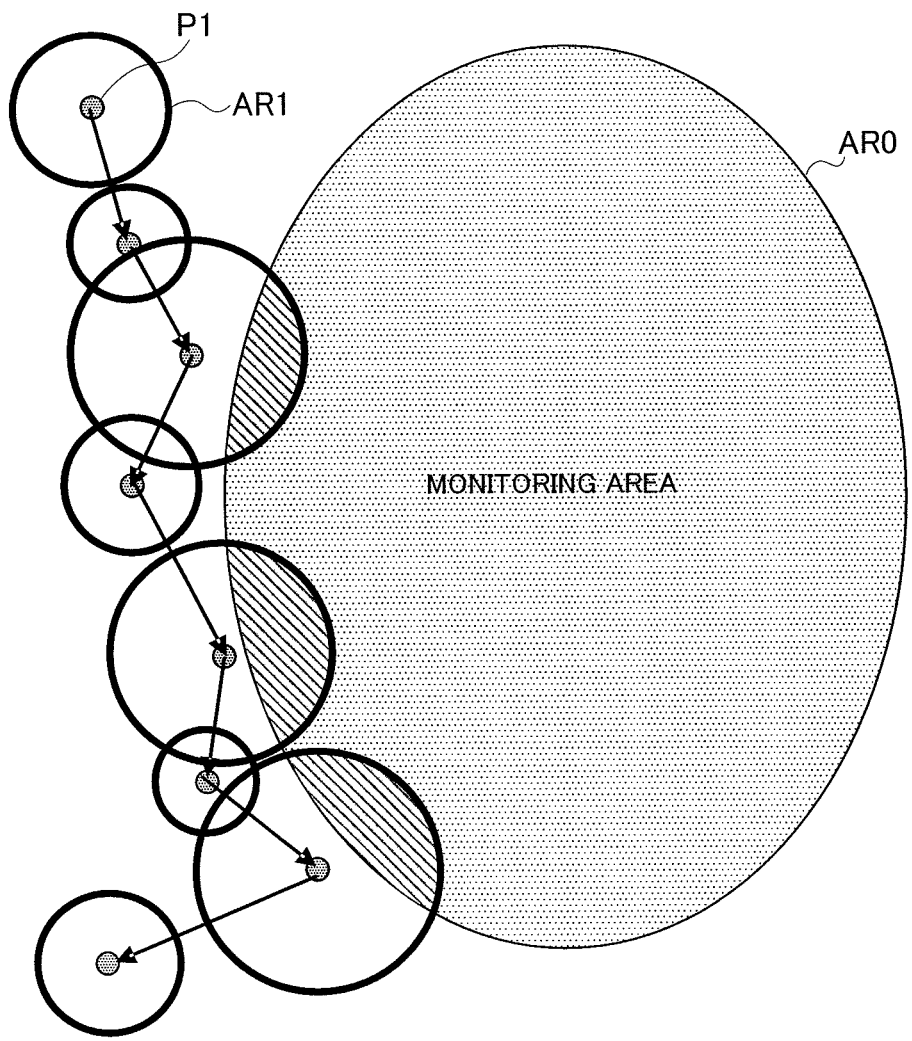
FIG. 3 is a diagram for explaining a portion in which a possible existing region and a monitoring area overlap with each other at a plurality of continuous position measuring points.

Moreover, the portion in which possible existing region AR1 and monitoring area AR0 overlap with each other at a plurality of position measuring points P1 for the predetermined period indicates a portion shown in shading of FIG. 3.

Next, a way of obtaining possible existing region AR1 will be described with reference to FIG. 4.

Depending on an environment in a position measurement, a position measuring situation or the like, a value $\sigma 2$ corresponding to a variance of a position measuring result (position measuring data) is obtained as a reliability. In an example of the embodiment, it is assumed that the same variance $\sigma 2$ is taken in x-axis and y-axis directions and a covariance is zero (position measuring precision in each of the x-axis and y-axis directions is independent).

Position measuring coordinates ($\mu x$, $\mu y$) are set to be a mean value and a probability density function of a normal distribution setting a reliability $\sigma 2$ as a variance, for example, the following equation is introduced to obtain a probability distribution (for example, a normal distribution).

Equation 1

$$f(x, y) = \frac{1}{2\pi\sigma^2}\exp\left(-\frac{1}{2}\left(\frac{(x-\mu_x)^2 + (y-\mu_y)^2}{\sigma^2}\right)\right) \quad [1]$$

Figure 4A:
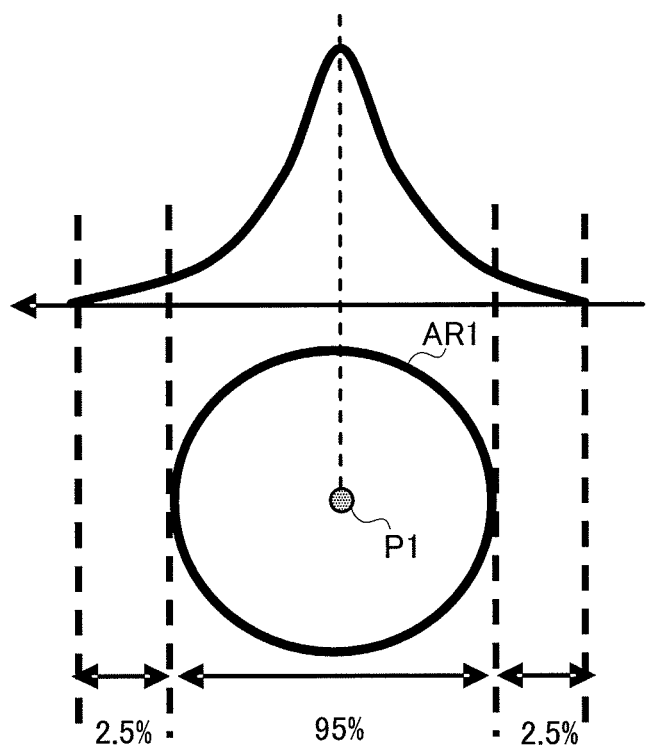
FIG. 4 is a chart for explaining a way of obtaining a possible existing region, FIG. 4A being a chart showing an example in which 95% of a region of a reliability interval in a probability distribution is set to be the possible existing region, and FIG. 4B being a chart showing an example in which a region having a certain probability or more is set to be the possible existing region.

FIG. 4A shows an example in which a region of a reliability interval of 95% (=a significance level of 5%) in a probability distribution is set to be possible existing region AR1. In the example, the variances on the x and y axes are set to be the same $\sigma 2$ and a covariance is set to be zero. Therefore, possible existing region AR1 is a circle.

Figure 4B:
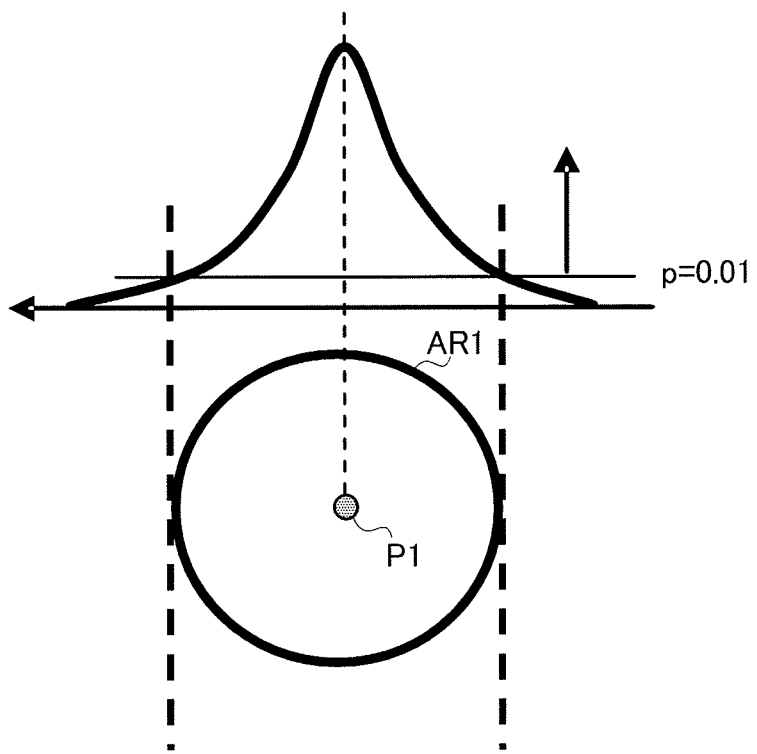

As shown in FIG. 4B, moreover, a region having a certain probability (p=0.01 in the example of the drawing) or more may be set to be possible existing region AR1.

A ratio of the reliability interval (a existence probability reference) may be varied depending on a security level of monitoring area AR0. If the existence probability reference is increased, possible existing region AR1 related to the same position measurement result is enlarged so that the security level can be increased (in other words, there is a high possibility that a doubtful position measurement result in the vicinity of a boundary on the outside of monitoring area AR0 might be decided to be an entry).

Furthermore, a two-dimensional normal distribution (a probability distribution) to be used for setting possible existing region AR1 may be calculated by the following equation in place of the equation 1. In the following equation, $\mu x$ represents an x coordinate of a position measurement result, $\mu y$ represents a y coordinate of the position measurement result, $\sigma x 2$ represents a variance of x, $\sigma y 2$ represents a variance of y, and $\rho xy$ represents a covariance of x and y.

Equation 2

$$f(x, y) = \frac{1}{2\pi\sigma_x\sigma_y\sqrt{1-\rho_{xy}^2}} \quad [2]$$

$$\exp\left[-\frac{1}{2(1-\rho_{xy}^2)}\left\{\frac{(x-\mu_x)^2}{\sigma_x^2} + \frac{(y-\mu_y)^2}{\sigma_y^2}\right\} - \frac{2\rho_{xy}(x-\mu_x)(y-\mu_y)}{\sigma_x\sigma_y}\right\}\right]$$

It is preferable that the equation 1 be applied to the case in which x and y components can be independently subjected to a position measurement and have the same precision. It is preferable that the equation 2 be applied in the case in which the x and y components have a correlation in the position measurement and have a difference in the precision in the position measurement. Possible existing region AR1 to be set by using the equation 2 is an ellipse.

FIG. 5 shows a state of a detection of entering and/or leaving according to the embodiment.

FIG. 5A-1 shows possible existing region AR1 to be set in the case in which the reliability of the position measurement is low, and FIG. 5B shows possible existing region AR1 to be set in the case in which the reliability of the position measurement is high. As shown in FIGS. 5A-2 and 5B-2, a part of possible existing region AR1 overlaps with monitoring area AR0 when the reliability of the position measurement is low even if a position of position measuring point P1 is the same (FIG. 5A-2), and the part of possible existing region AR1 does not overlap with monitoring area AR0 when the reliability of the position measurement is high (FIG. 5B-2). Accordingly, in the case in which there is used a criterion of "it is decided that the target enters monitoring area AR0 when a part of possible existing region AR1 overlaps with monitoring area AR0" as in (i), for example, it is possible to obtain different decision results (a decision result that entering is carried out in case of FIG. 5A-2 and a decision result that entering is not carried out in case of FIG. 5B-2) even if the position of point measuring point P1 is identical.

In the embodiment, thus, there is set possible existing region AR1 to be a target on which the reliability of the result of the position measurement is reflected, and entering and/or leaving of the target into and/or from monitoring area AR0 is decided based on the overlapping state of possible existing region AR1 and monitoring area AR0. Also in the case in which the position measurement error is made, consequently, it is possible to detect entering and/or leaving of the detecting target into and/or from monitoring area AR0 with high precision.

In order to decide entering and/or leaving (that is, entering/leaving), it is decided whether a target is positioned on an inside or outside of the monitoring area at a specific time. If it is decided that the target is positioned on the inside of the monitoring area, it is decided that the state of the entry is set. If the target is positioned on the outside of the monitoring area, it is decided that the state of leaving is set. In other words, the decision of entering and/or leaving (that is, entering/leaving) according to the invention is equivalent to the decision whether the target is positioned on the inside or outside of the monitoring area at the specific time.

[2] Structure

Figure 6:
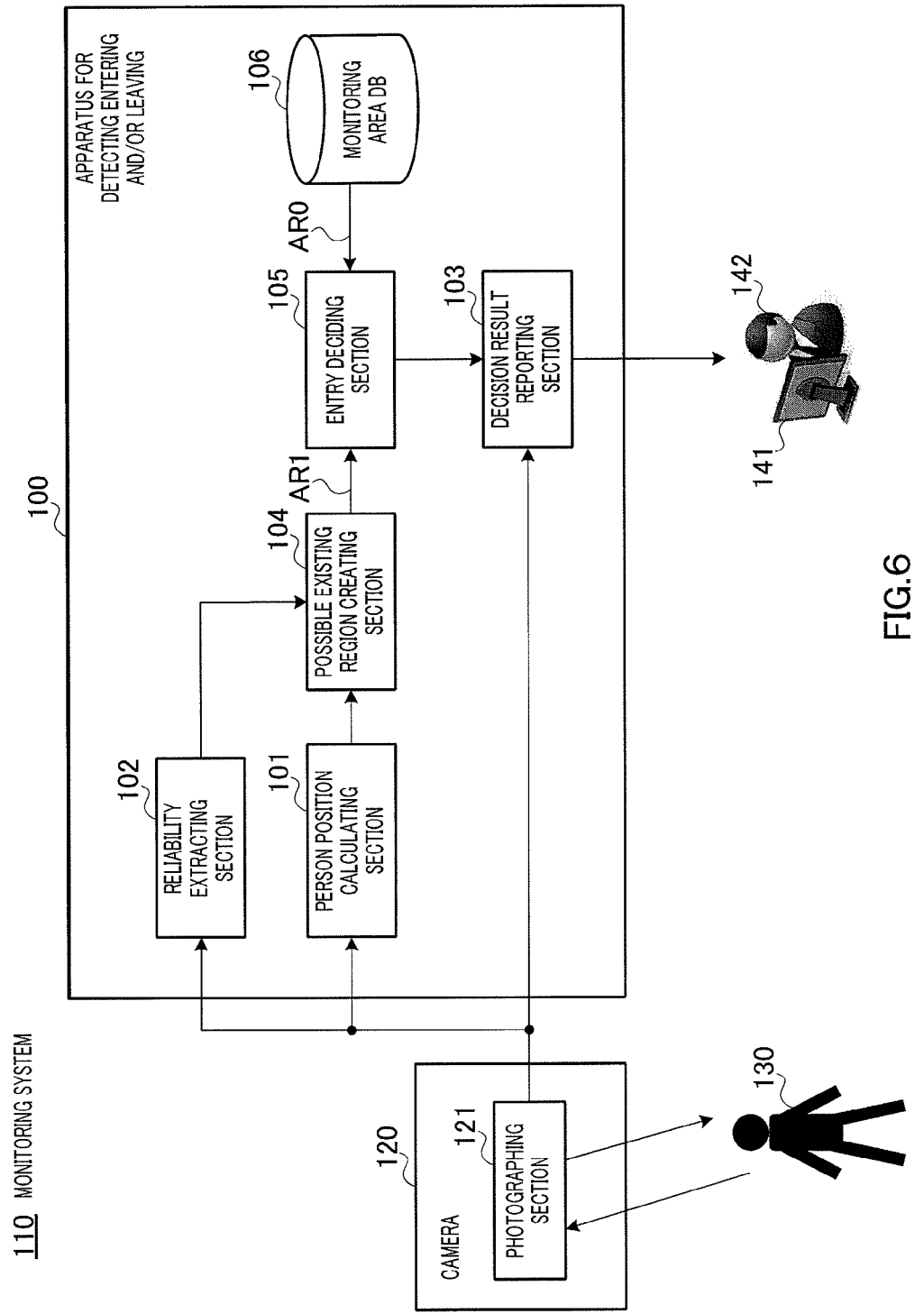
FIG. 6 is a block diagram showing a structure of an apparatus for detecting entering and/or leaving according to Embodiment 1 of the invention.

FIG. 6 shows a structure of an apparatus for detecting entering and/or leaving according to the embodiment. Description will be given to the case in which apparatus 100 for detecting entering and/or leaving according to the embodiment is applied to a monitoring system. Apparatus 100 for detecting entering and/or leaving is not limited to the monitoring system but can be applied to various uses such as a content delivering system for delivering a content related to a specific area wirelessly to only a person whose entry into a specific area is detected, for example. In the following, description will be given to the case in which a target of which entering and/or leaving is to be detected is a person. However, the detecting target is not limited to a person but the invention can be applied to a moving object which can be subjected to a position measurement, for example, an article, a vehicle, a movable monitoring robot and the like.

Monitoring system 110 photographs a video including target (person) 130 by means of photographing section 121 of camera 120, and transmits the photographed video to person position calculating section 101, reliability extracting section 102 and decision result reporting section 103 in apparatus 100 for detecting entering and/or leaving.

Person position calculating section 101 calculates a position of person 130 when person 130 is taken in the video acquired from photographing section 121, and transmits position information thus calculated as position measurement information to possible existing region creating section 104.

Reliability extracting section 102 extracts a reliability of the position measurement in person position calculating section 101 based on the video acquired from photographing section 121, and transmits the extracted reliability to possible existing region creating section 104. The reliability of the position measurement indicates a value corresponding to a variance of a position measurement result (position measurement data) which is varied depending on an environment in the position measurement, a situation of the position measurement or the like as described above.

Reliability extracting section 102 extracts a reliability (a variance) based on a position measurement situation parameter such as the number of pixels constituting person 130 in the video, a situation of an occlusion (a concealment) of the persons, a distinction of a contour or the like. More specifically, it is possible to obtain a reliability (a variance) by referring to a reliability table which is prepared in advance (a table indicative of a corresponding relationship between the position measurement situation parameter and the reliability or variance). A reliability table may be obtained from a theoretical model of image position measuring method or through an actual measurement in preliminary sampling.

In other words, reliability extracting section 102 outputs a result that a reliability is higher (a variance is smaller) if the number of the pixels constituting person 130 is larger (that is, person 130 is taken in a larger size), a result that the reliability is higher (the variance is smaller) if the occlusion (the concealment) of the persons is smaller, or a result that the reliability is higher (the variance is smaller) if the distinction of the contour of person 130 is higher.

Although the reliability of the position measurement is extracted based on the video acquired from photographing section 121 in the embodiment, it is also possible to extract the reliability based on a matching degree with a person template in person position calculating section 101. In other words, it is assumed that the reliability is higher (the variance is smaller) if the matching degree is higher. Also in this case, it is possible to obtain the reliability (the variance) by preliminarily preparing a reliability table (a table indicative of a corresponding relationship between the matching degree with the template and the reliability or variance). A way of extracting the reliability is not limited thereto.

FIG. 7 shows an example of the person position calculated by person position calculating section 101 and the reliability extracted by reliability extracting section 102. For each person (person ID), there is obtained a probability density function representing a time that the person is detected, coordinates of the position of the person, and the reliability.

A method for representing the reliability through the probability density function will be described. In the embodiment, a variance of a two-dimension normal distribution is used as an index representing a degree at which the result of the position measurement is reliable. Probability density functions $f1(x, y)$, $g1(x, y)$ and the like in the embodiment are two-dimensional normal distributions expressed in the equation 1, respectively. In the case in which a number of the function or a subscript is different, it is indicated that the variance $\sigma^2$ to be the parameter of the two-dimensional normal distribution is different.

Possible existing region creating section 104 creates possible existing region AR1 (FIGS. 1 to 5) for deciding entering and/or leaving based on the position measurement information acquired from person position calculating section 101 and the reliability of the position measurement which is acquired from reliability extracting section 102, and transmits possible existing region AR1 thus created to entry deciding section 105. A way of creating possible existing region AR1 has been described above with reference to FIG. 4 or the like.

Monitoring area database (DB) 106 holds area information indicative of monitoring area AR0 and offers the monitoring area information to entering and/or leaving deciding section 105. FIG. 8 shows an example of the monitoring area information to be stored in monitoring area DB 106. In the example of FIG. 8, two monitoring areas (Nos. 1 and 2) are stored. The monitoring area is expressed in a square coordinate in the example of the drawing. As a matter of course, however, it may take a shape other than the square. A user may set the monitoring area by utilizing a GUI (Graphical User Interface), for example.

Entering and/or leaving deciding section 105 decides any of (i) to (vi) based on possible existing region AR1 acquired from possible existing region creating section 104 and monitoring area AR0 held in monitoring area DB 106, thereby deciding whether person 130 enters monitoring area AR0 or not and transmitting a result of the decision of the entry to decision result reporting section 103.

Decision result reporting section 103 acquires the result of the decision from entry deciding section 105, and gives marking to the video acquired from photographing section 121 in such a manner that an entering person is known when the result of the decision indicates an entry, and outputs the video to monitor 141, thereby presenting, to manager 142, that person 130 enters monitoring area AR0.

Figure 9:
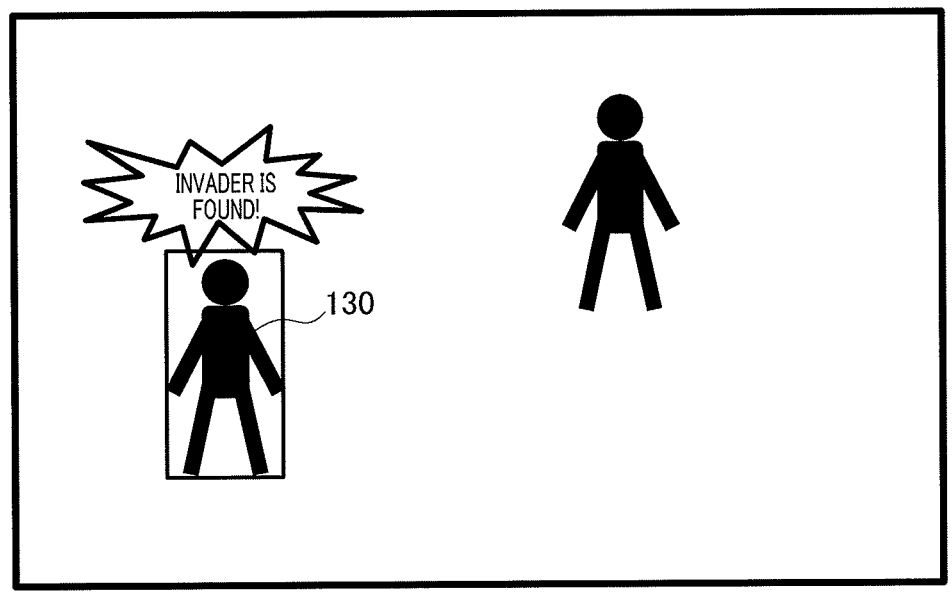
FIG. 9 is a view showing an example of an entry warning image to be displayed on a monitor.

FIG. 9 shows an example of an entry warning image to be displayed on monitor 141. In the example of the drawing, person 130 who is decided to enter monitoring area AR0 is surrounded by a frame. In addition, the characters "Invader is found" are displayed in the example of the drawing. Consequently, manager 142 can specify person 130 entering monitoring area AR0.

[3] Operation

Next, an operation according to the embodiment will be described. Apparatus 100 for detecting entering and/or leaving according to the embodiment has a feature in the processings of possible existing region creating section 104 and entry deciding section 105. Therefore, procedures for the processings will be described.

Figure 10:
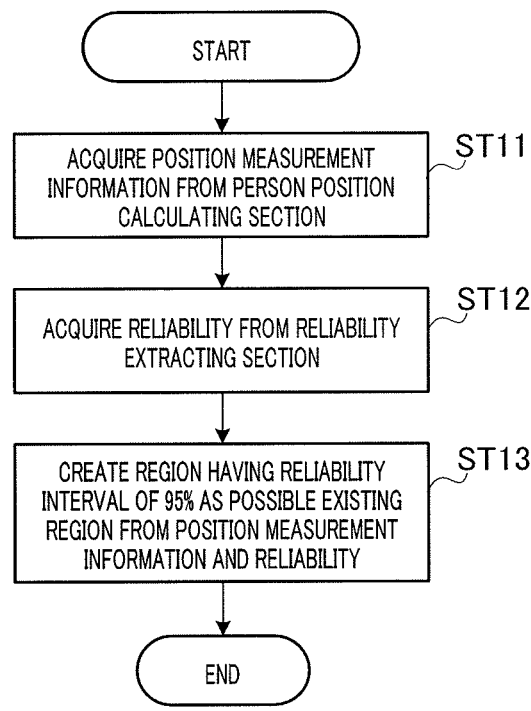
FIG. 10 is a flowchart showing a processing procedure for a possible existing region creating section.

FIG. 10 shows a processing procedure for possible existing region creating section 104. Possible existing region creating section 104 acquires position measurement information from person position calculating section 101 in step ST11, and furthermore, acquires a reliability from reliability extracting section 102 in step ST12. Possible existing region creating section 104 creates a region having a reliability interval of 95% as possible existing region AR1 with respect to a position measuring point as shown in FIG. 4A based on the position measurement information and the reliability in step ST13, for example. As a matter of course, possible existing region AR1 to be created is not limited to a region having the reliability interval of 95%.

Figure 11:
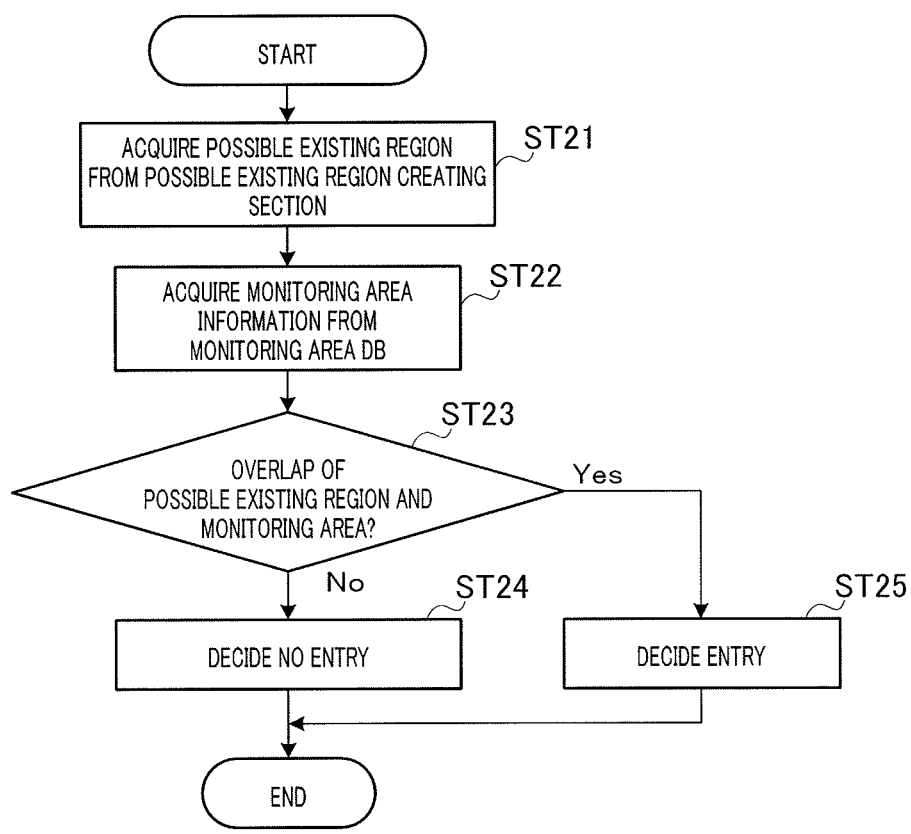
FIG. 11 is a flowchart showing a processing procedure for an entry deciding section.

FIG. 11 shows a processing procedure for entry deciding section 105. Entry deciding section 105 acquires information about possible existing region AR1 from possible existing region creating section 104 in step ST21, and furthermore, acquires information about monitoring area AR0 from monitoring area DB 106 in step ST22. At Step S23, it is decided whether possible existing region AR1 overlaps with monitoring area AR0 or not. Although there is shown the case in which the decision of (i) is carried out in step ST23 in the example of FIG. 11, any of (ii) to (vi) may be employed in place of the decision of (i). If a negative result is obtained in step ST23 (Step ST23: No), the processing proceeds to step ST24 in which it is decided that person 130 does not enter monitoring area AR0. If a positive result is obtained in step ST23 (Step ST23: Yes), the processing proceeds to step ST25 in which it is decided that person 130 enters monitoring area AR0.

For example, in the case in which a possible existing region generated from f1(x, y) to be a reliability of user ID 001 has a radius of 35 and a possible existing region generated from f2(x, y) to be a reliability of user ID 003 has a radius of 15, the possible existing region having user ID 001 overlaps with monitoring area No. 1 if the decision of (i) is carried out. Consequently, it is decided that entering is carried out. Since the possible existing region having user ID 003 does not overlap with any monitoring area, it is not decided that entering is carried out.

[4] Effect

As described above, according to the invention, there are provided reliability extracting section 102 serving as position measurement reliability detecting section, possible existing region creating section 104 that determines possible existing region AR1 based on a result of a position measurement and a reliability (position measuring precision), and entry deciding section 105 that decides entering and/or leaving of a target into and/or from monitoring area AR0 based on an overlap of possible existing region AR1 and monitoring area AR0. Also in the case in which a position measurement error is made, consequently, it is possible to detect entering and/or leaving of detecting target 130 into and/or from monitoring area AR0 with high precision.

Although the description has been given to the case in which the target is subjected to the position measurement by using the video obtained by camera 120 in the embodiment, a position measuring method is not limited thereto. For example, it is also possible to carry out the position measurement by using a signal sent from a wireless tag attached to the target. It is possible to attach, to the target, anything which can cause apparatus 100 for detecting entering and/or leaving to identify the target and can measure the position of the target in a space. For example, an RFID (Radio Frequency IDentification) may be used in addition to the wireless tag. Moreover, the wireless tag attached to the target may transmit, to apparatus 100 for detecting entering and/or leaving, a result of the position measurement carried out independently through a GPS (Global Positioning System) or the like.

In this case, it is preferable to detect a position measurement reliability based on a situation of a radio receipt from the wireless tag. The situation of the radio receipt includes an RSSI (Received Signal Strength Indicator), a WEI (Word Error Indicator), a BEI (Bit Error Indicator), a BER (Bit Error Rate), an SNR (Signal to Noise Ratio) or the like for a received signal, for example. Also in this case, it is possible to obtain a reliability (a variance) from a parameter of a situation of a radio receipt by referring to a reliability table prepared preliminarily based on a theoretical calculation or a sampling measurement (a table indicative of a corresponding relationship between the parameter of the situation of the radio receipt and the reliability or the variance). Moreover, position measurement data may be obtained by using a sensing signal sent from a sensor group embedded in a ground, a floor, a table or the like, for example. Alternatively, they may be obtained by using another sensor such as an image sensor or an ultrasonic sensor. Also in those cases, it is possible to obtain a reliability for the position measurement in the same manner.

[Embodiment 2]
[1] Principle

In a monitoring apparatus, it is important to (1) detect an entry of a suspicious person without fail and (2) avoid an unnecessary entry decision, thereby decreasing a wasteful warning output. By using the structure and the method according to Embodiment 1, both of the requests of (1) and (2) can be met. In the embodiment, however, there are presented an apparatus and a method which can meet the request of (2) more fully.

In other words, in the embodiment, there is presented a monitoring apparatus capable of accurately deciding entering and/or leaving without fail, and furthermore, giving only a necessary and sufficient warning notice without an unnecessary warning notice.

Figure 12:
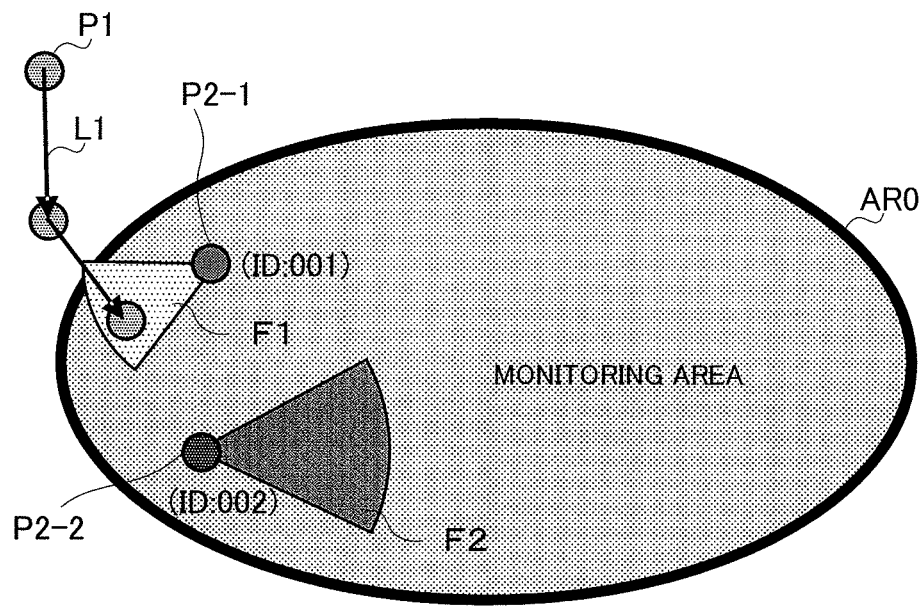
FIG. 12 is a diagram showing an image according to Embodiment 2.

FIG. 12 shows an image of the present embodiment.

A black circle indicated as the reference symbol P1 denotes a position measuring point of a person having no authority for entering monitoring area AR0 that is an entry detecting target. The reference symbol L1 indicates a flow line connecting position measuring points P1 at a plurality of times. The reference symbols P2-1 and P2-2 indicate a position measuring point of a person (for example, an employee or the like) having an authority for entering monitoring area AR0. In the drawing, there are shown position measuring point P2-1 of an employee having a person ID of "001" and position measuring point P2-2 of an employee having a person ID of "002." Regions indicated as reference symbols F1 and F2 are visible regions, and F1 denotes the visible region of the employee having the person ID of "001" and F2 denotes the visible region of the employee having the person ID of "002."

In the embodiment, also in the case in which it is detected that a person having no entry authority enters monitoring area AR0 as shown in FIG. 12, an warning output is not carried out when position measuring point P1 of the person exists in visible region F1 of a person having the entry authority. Consequently, it is possible to decrease an unnecessary warning notice.

A way of obtaining the visible region will be described with reference to FIG. 13.

First of all, a visual line direction is obtained by connecting a position measuring point at time t and a position measuring point at time t−1 to extend a line toward time t side. Next, a region placed apart from the position measuring point at time t by Y cm is set to be a visible region in a visual line direction of ±X°.

Figure 13:
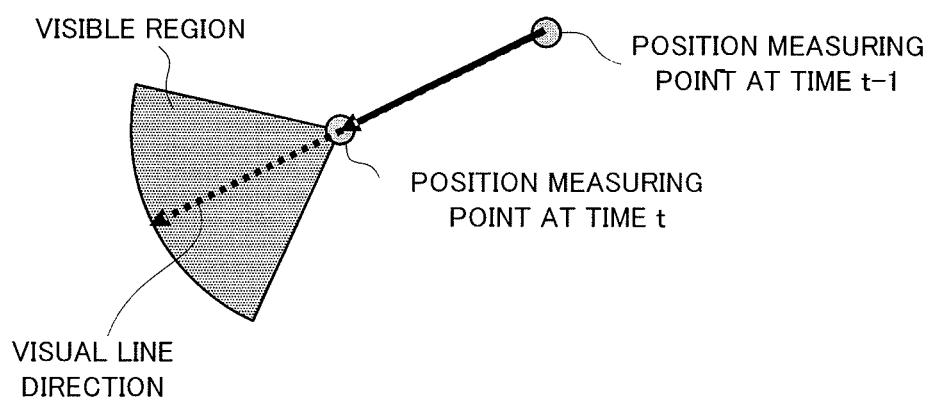
FIG. 13 is a diagram for explaining a way of obtaining a visible region.

Although the visual line direction is obtained from the line (the flow line) connecting the position measuring points at the different times in the example of FIG. 13, the way of obtaining the visual line direction is not limited thereto. For example, it is also possible to attach a plurality of wireless tags to a person, thereby obtaining the visual line direction based on a difference in a result of a position measurement for the tag. Moreover, it is also possible to carry out an image processing over a camera image, thereby deciding a direction of a face to obtain the visual line direction. Furthermore, it is also possible to directly acquire the visual line direction by using a gyrosensor, a magnetic field sensor or the like.

Although a fixed visible region is created in the example of FIG. 13, moreover, the visible region may be changed depending on a peripheral situation of a person (for example, there is a shielding object or the like) or a personal attribute (a value of an eyesight or the like). The peripheral situation may be acquired by referring to a peripheral situation database storing three-dimensional arrangement data of the shielding object or the like, for example. It is preferable to obtain the personal attribute by acquiring a person ID through a position calculating section or a photographing section and referring to a personal attribute database storing the person ID and the attribute data which correspond to each other, for example.

Furthermore, it is more preferable that the visible region be created in consideration of a reliability for a position measurement. In other words, in the example of FIG. 13, the visible region is created based on only the position measuring point. By creating the visible region in consideration of the reliability for the position measurement, however, it is possible to set, as the visible region, only a region which can surely be recognized visually also in the case in which a position measurement error is made. Consequently, it is possible to avoid a situation in which a person having an authority misses seeing a suspicious person and an warning is not output, for example. Therefore, a security can be enhanced. In other words, since the visible region establishes the premise that an employee or the like can monitor a suspicious person, a visual recognition has to be surely carried out therein. In the case in which the visible region is created in consideration of the reliability for the position measurement, only a region which surely enters a field of view is defined to be the visible region for any position measurement error.

Figure 14:
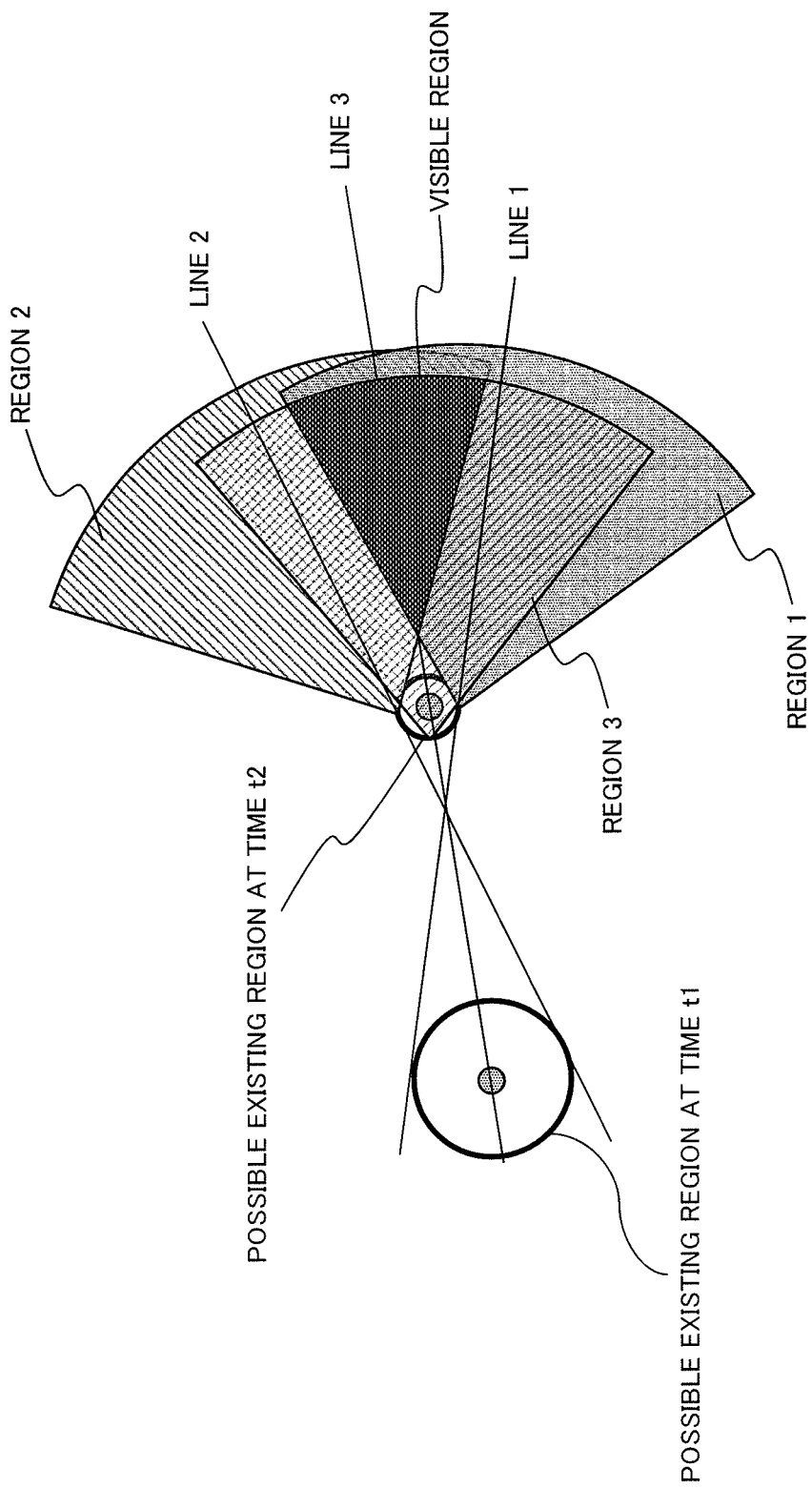
FIG. 14 is a diagram for explaining a way of obtaining a visible region which takes a reliability of a position measurement into consideration.

FIG. 14 shows an example of a way of obtaining the visible region. In other words, there is shown an example of a way of obtaining a region entering a field of view irrespective of the position measurement error.

Lines 1 and 2 are inscribed lines of a possible existing region at time t1 for a person having an authority and a possible existing region at time t2 for the person having the authority. Region 1 is disposed at a view angle of 60 degrees around a direction of line 1 from a contact point of line 1 and the possible existing region at time t2 (±30 degrees at left and right side of line 1) by a distance of 3 m. Region 2 is created in the same manner as region 1 with respect to line 2. Region 3 is disposed at a view angle of 60 degrees around the direction of line 3 by a distance 3 m. A region overlapping with all of these three regions is set to be a visible region. It is preferable that the possible existing region be obtained by the same method as possible existing region AR1.

Figure 15A:
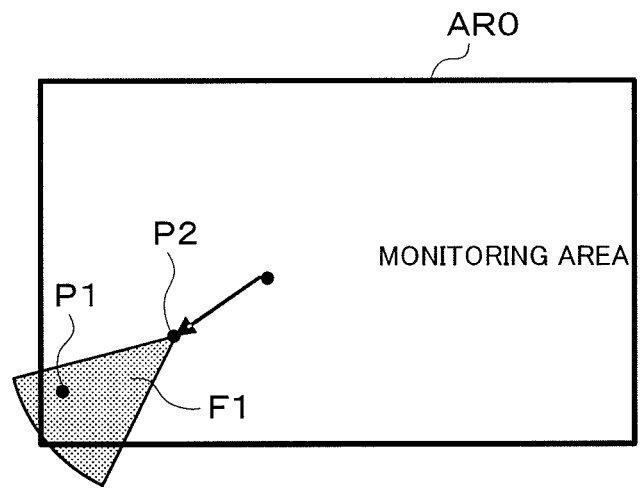
FIG. 15A is a diagram showing the case in which a position measuring point of a person having no authority is detected in the visible region.
Figure 15B:
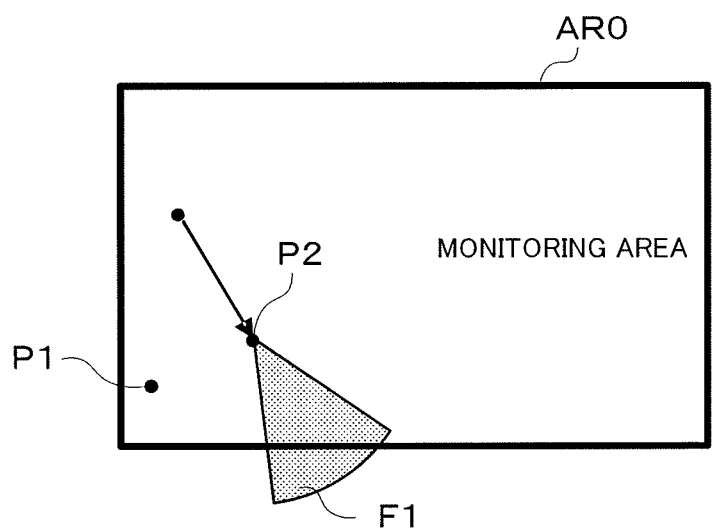
FIG. 15B is a diagram showing the case in which the position measuring point of the person having no authority is not detected in the visible region.

FIG. 15 shows an example of a monitoring state according to the embodiment. As shown in FIG. 15A, also in the case in which position measuring point P1 of a person having no authority is detected in monitoring area AR0, an warning (an entry notifying warning) is not output when position measuring point P1 exists in visible region F1 of a person having an authority such as an employee. On the other hand, in the case in which position measuring point P1 of the person having no authority is detected in monitoring area AR0 and position measuring point P1 does not exist in visible region F1 as shown in FIG. 15B, an warning indicating that an invader exists (the entry notifying warning) is output.

[2] Structure

Figure 16:
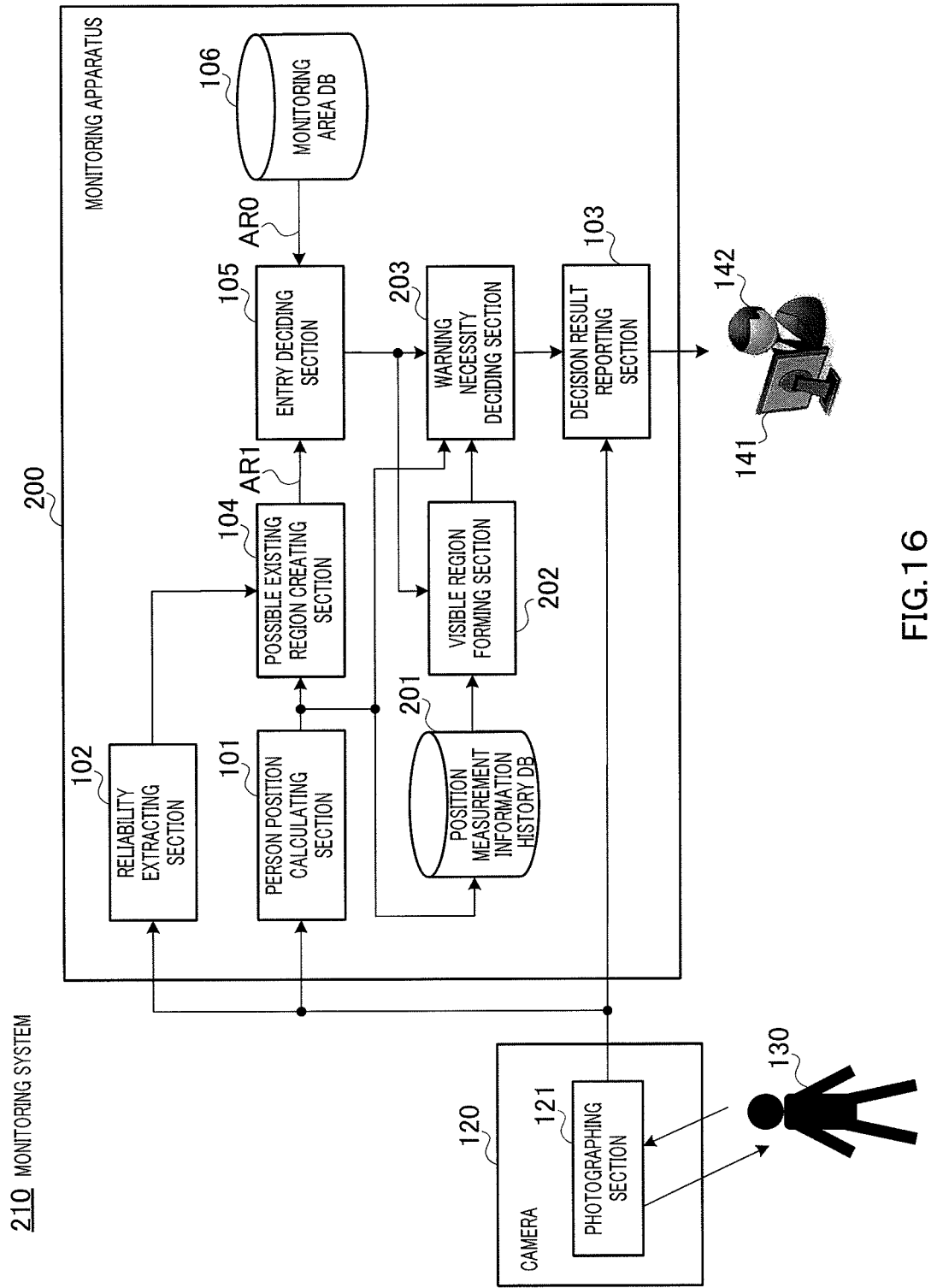
FIG. 16 is a block diagram showing a structure of a monitoring system according to Embodiment 2.

In FIG. 16 showing corresponding portions to FIG. 6 which have the same reference numerals, there is illustrated a structure of a monitoring system according to the embodiment. Monitoring system 210 has camera 120, monitoring apparatus 200 and monitor 141. Monitoring apparatus 200 has the same structure as that of apparatus 100 for detecting entering and/or leaving in FIG. 6 except that there are provided position measurement information history database (DB) 201, visible region forming section 202 and warning necessity deciding section 203.

Position measurement information history DB 201 holds position measurement information sent from person position calculating section 101 and offers a history of a position measurement to visible region forming section 202.

Visible region forming section 202 inputs, from entry deciding section 105, a position measuring point of a person decided to carry out an entry and having no entry authority and furthermore, inputs, from position measurement information history DB 201, a history of a point measuring point for a person having an entry authority, and forms, from them, a visible region for a person having an entry authority and positioned in the vicinity of the person decided to enter monitoring area AR0 and having no entry authority and transmits the visible region to warning necessity deciding section 203.

Visible region forming section 202 may obtain the visible region as shown in FIG. 13 or may obtain the visible region taking a reliability of a position measurement into consideration as shown in FIG. 14. In the case in which the visible region taking the reliability of the position measurement into consideration is to be obtained, it is preferable to obtain possible existing region for a person having an entry authority by reliability extracting section 102 and possible existing region creating section 104, thereby inputting the possible existing region to visible region forming section 202.

Warning necessity deciding section 203 inputs, from entry deciding section 105, a position measuring point of a person decided to carry out an entry and having no entry authority, and furthermore, inputs a visible region from visible region forming section 202, and decides whether a person having an entry authority visually recognizes the entry of the person having no entry authority or not. If it is decided that the person having the entry authority visually recognizes the entry, warning necessity deciding section 203 outputs, to decision result reporting section 103, a decision result indicating that an warning is unnecessary. On the other hand, if it is decided that the person having the entry authority does not visually recognize the entry, warning necessity deciding section 203 outputs, to decision result reporting section 103, a decision result indicating that the warning is necessary.

FIG. 17A shows an example of a person position and a reliability for an invader having no entry authority. FIG. 17B shows a first example of a person position and a reliability for a person having an entry authority. FIG. 17C shows a second example of the person position and the reliability for the person having the entry authority. FIG. 17D shows an example of monitoring area information to be stored in monitoring area DB 106. In the case in which the person having the entry authority in the position measuring point data of FIG. 17B exists in contrast with the invader in the position measuring point data of FIG. 17A, it is decided that the warning is unnecessary in warning necessity deciding section 203. On the other hand, in the case in which the person having the entry authority in the position measuring point data of FIG. 17C exists in contrast with the invader in the position measuring point data of FIG. 17A, it is decided that the warning is necessary in warning necessity deciding section 203.

[3] Operation

Figure 18:
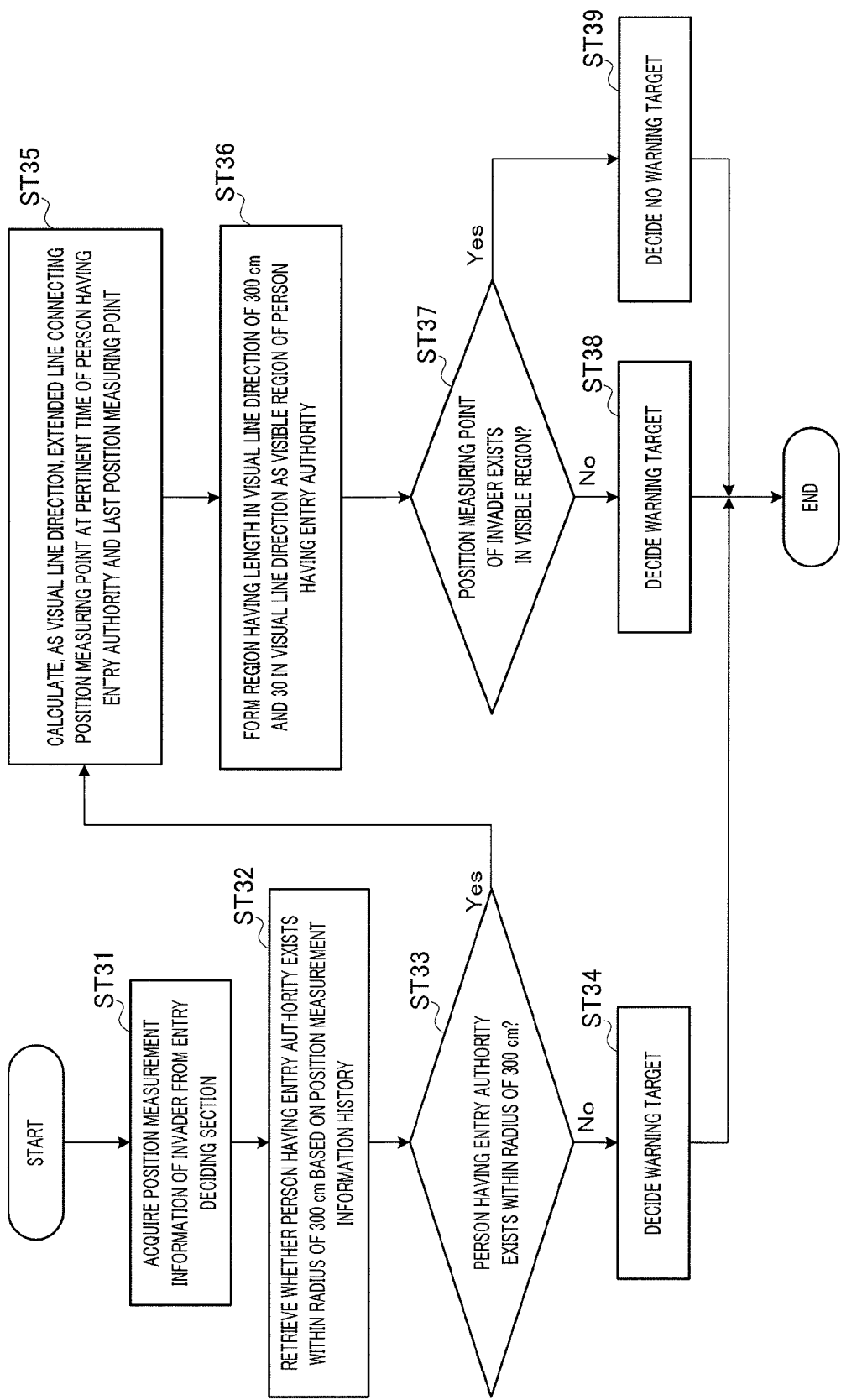
FIG. 18 is a flowchart for explaining an operation according to Embodiment 2.

Next, an operation according to the embodiment will be described. Monitoring apparatus 200 according to the embodiment has a feature in the processings of visible region forming section 202 and warning necessity deciding section 203. Therefore, procedures for the processings will be described with reference to FIG. 18.

In step ST31, visible region forming section 202 acquires information about a position measuring point of a person decided to carry out an entry by entry deciding section 105 and having no entry authority. In step ST32, visible region forming section 202 refers to position measurement information history DB 201 to retrieve whether a person having an entry authority exists within a range of a radius 300 [cm] around the position measuring point acquired in step ST31, for example.

If visible region forming section 202 decides that the person having the entry authority does not exist within the range of the radius of 300 [cm] in step ST33 (Step ST33: No), the processing proceeds to step ST34 in which visible region forming section 202 reports to warning necessity deciding section 203 that the invader is an warning target and warning necessity deciding section 203 decides that the invader is the warning target.

On the other hand, if visible region forming section 202 decides that the person having the entry authority exists within the range of the radius of 300 [cm] (Step ST33: Yes), the processing proceeds to step ST35 in which an extended line connecting a position measuring point at a pertinent time of the person having the entry authority and a last position measuring point is calculated as a visual line direction (see FIG. 13). In step ST36, visible region forming section 202 forms a region having a length of 300 [cm] in the visual line direction and an angle of ±30° with respect to the visual line direction as a visible region of a person having an entry authority, for example (see FIG. 13).

In step ST37, warning necessity deciding section 203 decides whether a position measuring point of an invader having no entry authority exists in the visible region or not. If a negative result is obtained in step ST37 (see FIG. 15B), the processing proceeds to step ST38 in which warning necessity deciding section 203 decides that the invader is an warning target. On the other hand, if a positive result is obtained in step ST37 (see FIG. 15A), the processing proceeds to step ST39 in which warning necessity deciding section 203 decides that the invader is not the warning target.

[4] Effect

As described above, according to the embodiment, there are provided visible region forming section 202 and warning necessity deciding section 203. Also in the case in which it is decided that a target having no entry authority into monitoring area AR0 enters monitoring area AR0, an warning is not output if a position measuring point of the entering target is included in a visible region of a person having an entry authority into monitoring area AR0. Consequently, it is possible to actually prevent an unnecessary warning from being output.

[Embodiment 3]

[1] Principle

In the embodiment, an apparatus and a method which can meet the request of (2) (that is, to avoid an unnecessary entry decision, thereby decreasing a wasteful warning output) more fully are presented in the same manner as in Embodiment 2. In other words, in the embodiment, there is presented a monitoring apparatus capable of accurately deciding entering and/or leaving without fail and giving only a necessary and sufficient warning notice without an unnecessary warning notice.

Figure 19:
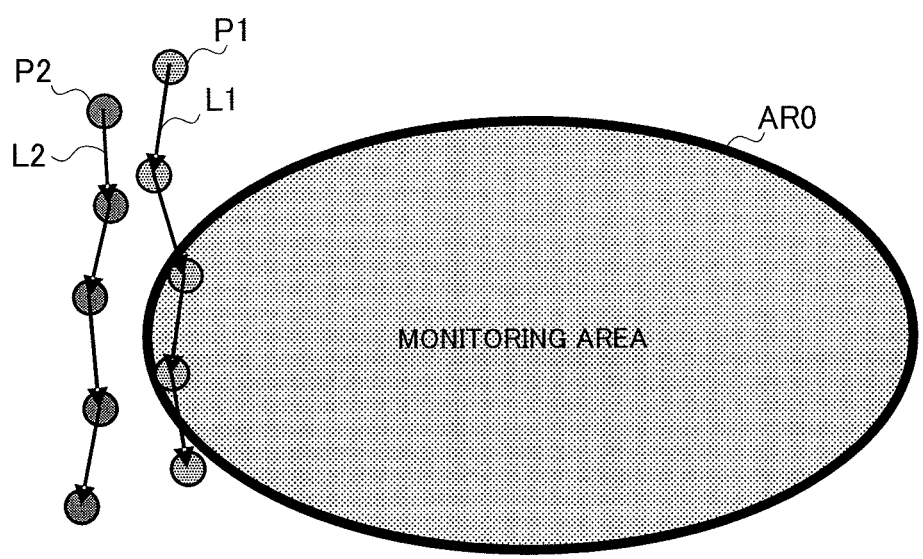
FIG. 19 is a diagram showing an image according to Embodiment 3.

FIG. 19 shows an image of the present embodiment. In the embodiment, also in the case in which it is detected that a person having no entry authority enters monitoring area AR0, an warning is not output if the person is accompanied by a person having an entry authority.

A black circle indicated as the reference symbol P1 denotes a position measuring point of a person having no entry authority into monitoring area AR0 that is an entry detecting target. The reference symbol P2 indicates a position measuring point of a person having an entry authority into monitoring area AR0 (for example, an employee or the like).

In the embodiment, a line connecting position measuring points before and after the position measuring point at which a person having no entry authority enters monitoring area AR0 by several position measuring points is used as similarity deciding line L1. Moreover, a line connecting position measuring points at a plurality of times of a person having an entry authority at the same time as position measuring points which are a basis of similarity deciding flow line L1 is used as similarity deciding line L2.

The similarities of similarity deciding flow line L1 and similarity deciding line L2 are decided so that it is decided whether a person having no entry authority is accompanied by a person having an entry authority or not. As shown in FIG. 19, also in the case in which it is detected that the person having no entry authority enters monitoring area AR0, an warning output is not carried out if it is decided that the person is accompanied by the person having the entry authority. Consequently, it is possible to decrease unnecessary warning notices.

Although a method for deciding that a person having no entry authority is accompanied by a person having an entry authority includes the following methods (i) to (iv) in the embodiment, for example, the invention is not limited thereto. A distance between similarity deciding flow lines L1 and L2 which will be described below indicates a distance between position measuring points at an identical time in distances between the position measuring point of the person having the entry authority and the position measuring point of the person having no entry authority which are a basis of similarity deciding flow lines L1 and L2. Moreover, it is also preferable to actually use, for the distance, a mean value of the plurality of position measuring points.

(i) If the distance between similarity deciding flow lines L1 and L2 is equal to or smaller than a predetermined value, it is decided that the accompaniment is carried out.

(ii) If the distance between similarity deciding flow lines L1 and L2 is equal to or smaller than a predetermined value and an angle formed by similarity deciding flow lines L1 and L2 is equal to or smaller than a predetermined value, it is decided that the accompaniment is carried out.

(iii) If the distance between similarity deciding flow lines L1 and L2 is equal to or smaller than a predetermined value and a difference in length between similarity deciding flow lines L1 and L2 (or a difference in speed between a person having an entry authority and a person having no entry authority) is equal to or smaller than a predetermined value, it is decided that the accompaniment is carried out.

(iv) If the angle formed by similarity deciding flow lines L1 and L2 is equal to or smaller than a predetermined value and the difference in length between similarity deciding flow lines L1 and L2 (or the difference in speed between the person having the entry authority and the person having no entry authority) is equal to or smaller than a predetermined value, it is decided that the accompaniment is carried out.

Figure 20A:
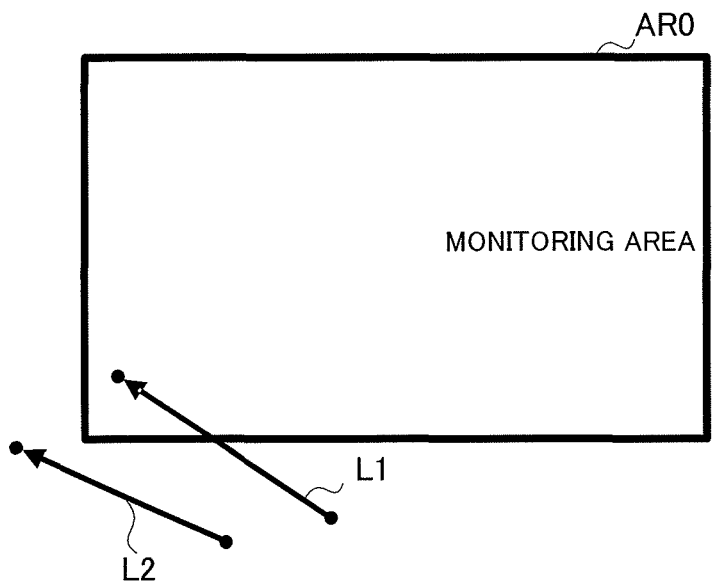
FIG. 20A is a diagram showing an example of an warning non-necessity and FIG. 20B is a diagram showing an example of an warning necessity.
Figure 20B:
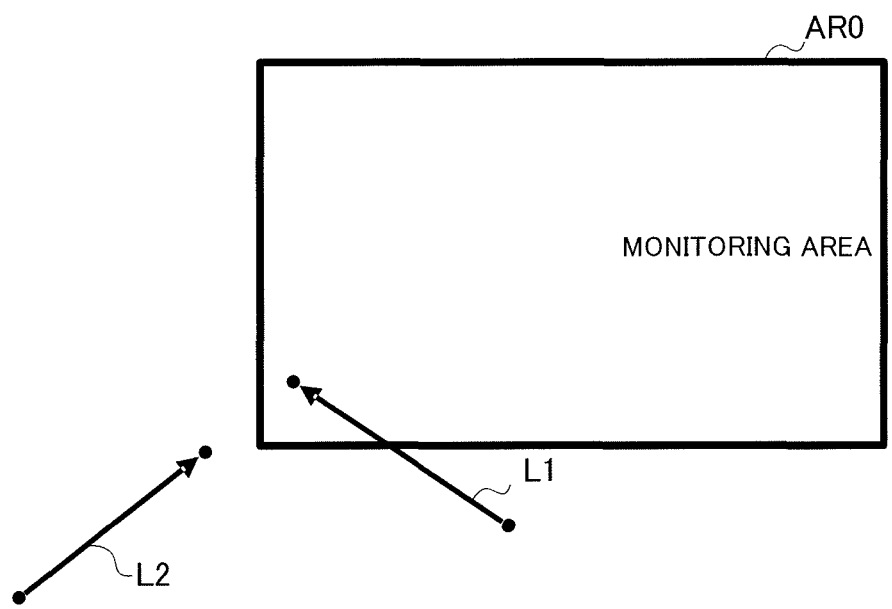

FIG. 20 shows an image of an warning necessity decision according to the embodiment. In the case in which the criterion of (iv) is used among (i) to (iv), it is decided that the person having no entry authority is accompanied by the person having the entry authority and the warning is unnecessary because the distance between similarity deciding flow lines L1 and L2 is equal to or smaller than the predetermined value and the angle formed by similarity deciding flow line L1 and L2 is equal to or smaller than the predetermined value in FIG. 20A. On the other hand, in FIG. 20B, the difference in length between similarity deciding flow lines L1 and L2 is equal to or smaller than the predetermined value but the angle formed by similarity deciding flow lines L1 and L2 is greater than the predetermined value. Therefore, it is decided that the person having no entry authority is not accompanied by the person having the entry authority and the warning is necessary.

The invention is not limited to the similarity decision based on only the position measuring point but the similarity decision may be carried out in consideration of a reliability of a position measuring point.

Figure 21:
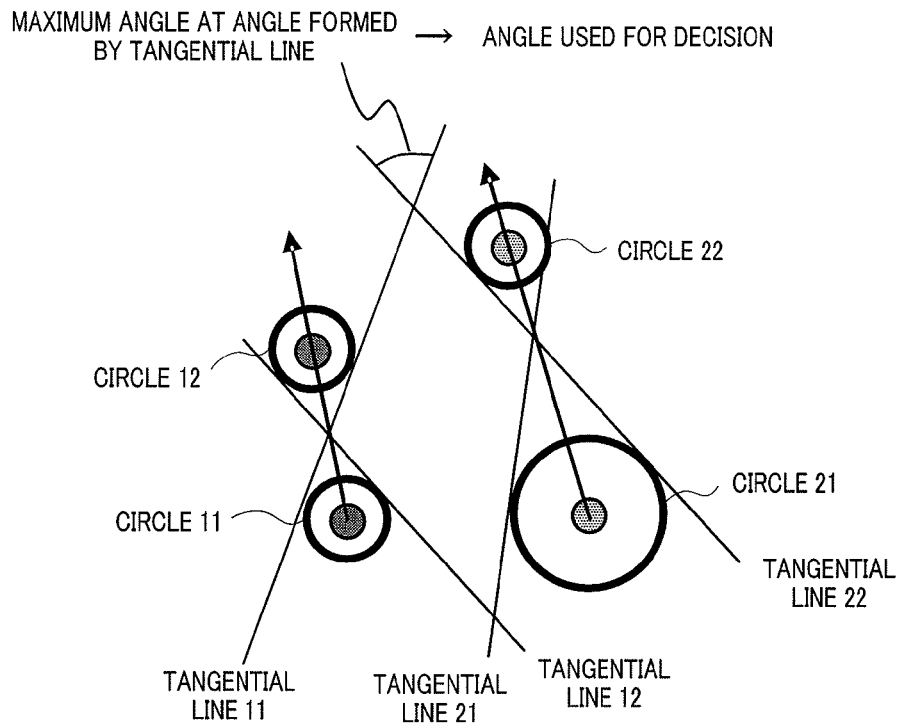
FIG. 21 is a diagram for explaining an angle formed by similarity deciding flow lines in consideration of a reliability of a position measuring point.
Figure 22:
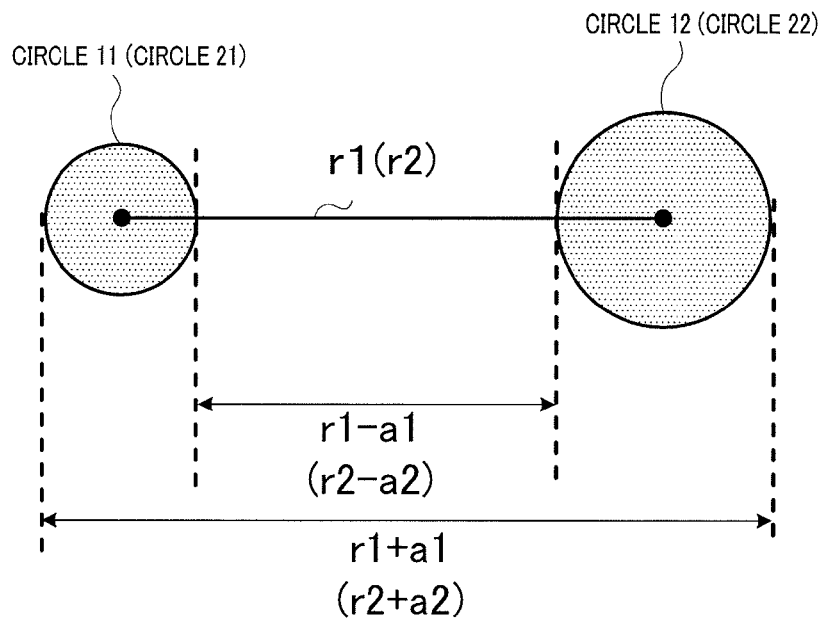
FIG. 22 is a diagram for explaining a difference in length between the similarity deciding flow lines in consideration of the reliability of the position measuring point.

With reference to FIGS. 21 and 22, description will be given to a way of deciding an accompaniment in consideration of a reliability of a position measuring point in the case in which the criterion of (iv) is employed.

First of all, description will be given to a way of obtaining the angle formed by similarity deciding flow lines L1 and L2 in consideration of the reliability. As shown in FIG. 21, circles 11 and 12 to be possible existing regions at times t1 and t2 for a deciding target (a person having no entry authority) are set, and circles 21 and 22 to be possible existing regions at times t1 and t2 for an accompanying candidate (a person having the entry authority) are set. Next, tangential lines 11 and 12 to be inscribed lines of circles 11 and 12 are drawn, and tangential lines 21 and 22 to be inscribed lines of circles 21 and 22 are drawn.

A possible existing range of similarity flow line L1 of the person having no entry authority is provided between tangential lines 11 and 12. A possible existing range of similarity flow line L2 of the person having the entry authority is provided between tangential lines 21 and 22. Accordingly, an angle in any of combinations of the tangential lines including tangential lines 11 and 21, tangential lines 11 and 22, tangential lines 12 and 21, and tangential lines 12 and 22 in which an angle formed by the tangential lines is the greatest is set to be a deciding target angle. In other words, an angle on a condition that a position measurement error is the greatest is used as the deciding target angle.

Next, a way of obtaining the difference in length between similarity deciding flow lines L1 and L2 as in (iii) and (iv) will be described with reference to FIG. 22. In FIG. 21, when a distance between centers of circles 11 and 12 is represented by r1, a distance between centers of circles 21 and 22 is represented by r2, a total of radii of the possible existing regions in circles 11 and 12 is represented by a1, and a total of radii of the possible existing regions in circles 21 and 22 is represented by a2, a difference between (r1+a1) and (r2−a2) or a difference between (r1−a1) and (r2+a2) which is greater is set to be a deciding target line length.

In other words, in the case in which a position measurement error is considered, the difference in length between similarity deciding flow lines L1 and L2 on the condition that the position measurement error is the greatest is obtained in the case in which one of similarity deciding flow lines L1 and L2 is the shortest and the other is the longest. More specifically, either a difference between the length (r1+a1) in the case in which similarity deciding flow line L1 of the person having no entry authority is the longest and the length (r2−a2) in the case in which similarity deciding flow line L2 of the person having the entry authority is the shortest or a difference between the length (r1−a1) in the case in which similarity deciding flow line L1 of the person having no entry authority is the shortest and the length (r2+a2) in the case in which similarity deciding flow line L2 of the person having the entry authority is the longest is set to be a maximum length difference. Therefore, it is preferable to use the maximum length difference as the deciding target. Although the length difference in a single interval has been described for simplicity of the explanation, it is a matter of course that a decision may be made based on a difference in length between a plurality of intervals.

By making the decisions of (i) to (iv) on the condition that the position measurement error is the maximum in consideration of the reliability of the position measuring point, thus, it is possible to decide that the accompaniment is carried out only when the person having no entry authority is surely accompanied by the person having the entry authority. As a result, it is possible to avoid a decision that the accompaniment is carried out though the accompaniment is not carried out due to the position measurement error. Consequently, it is possible to avoid an warning failure.

[2] Structure

Figure 23:
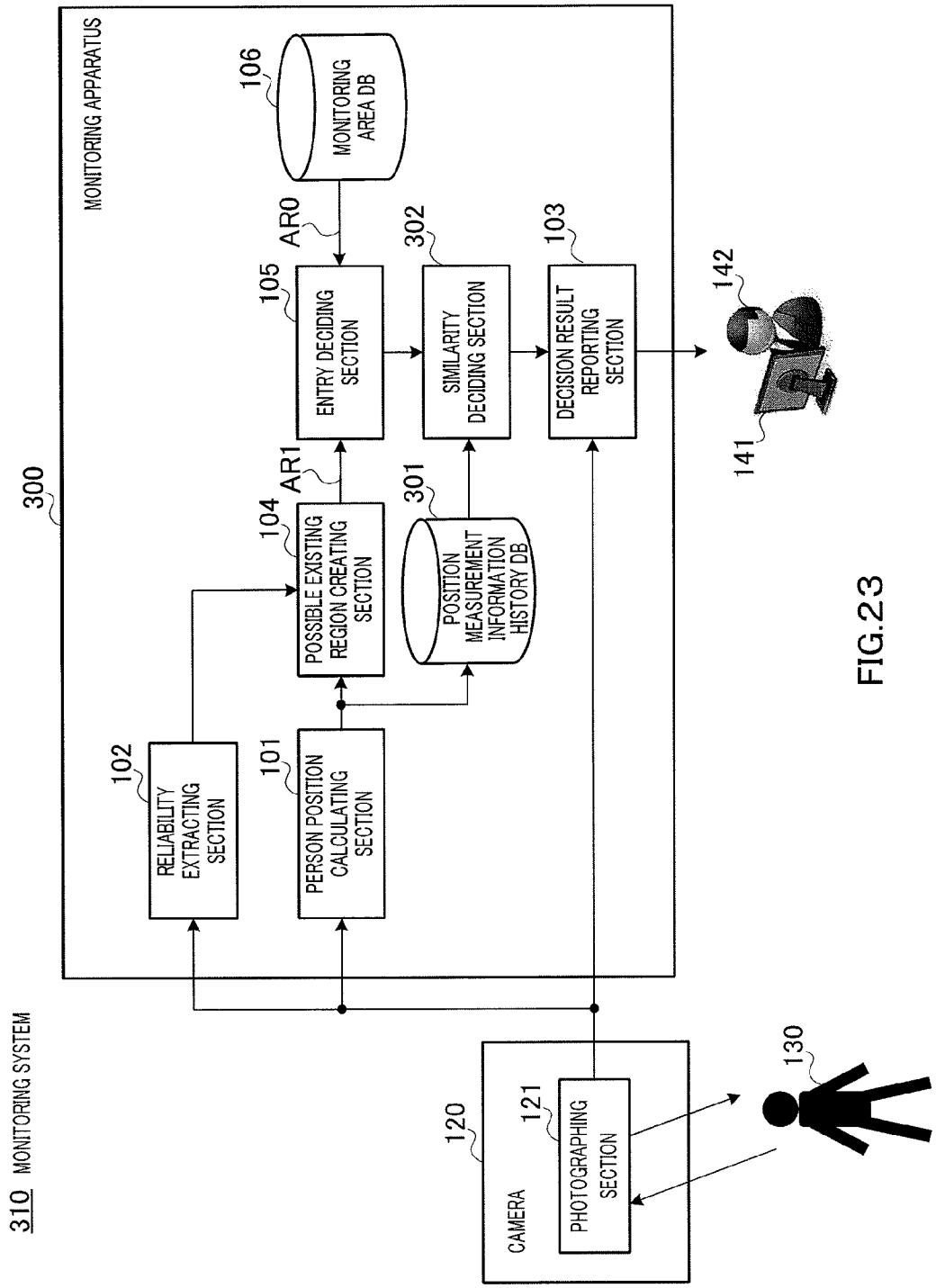
FIG. 23 is a block diagram showing a structure of a monitoring system according to Embodiment 3.

In FIG. 23 showing corresponding portions to FIG. 6 which have the same reference numerals, there is illustrated a structure of a monitoring system according to the embodiment. Monitoring system 310 has camera 120, monitoring apparatus 300 and monitor 141. Monitoring apparatus 300 has the same structure as that of apparatus 100 for detecting entering and/or leaving in FIG. 6 except that it has position measurement information history database (DB) 301 and similarity deciding section 302.

Position measurement information history DB 301 holds position measurement information sent from person position calculating section 101 and offers a history of a position measurement to similarity deciding section 302.

Similarity deciding section 302 inputs, from entry deciding section 105, a position measuring point for a person having no entry authority that is decided to carry out an entry, and furthermore, inputs, from position measurement information history DB 301, a history of position measuring points of a person having an entry authority and the person having no entry authority. Similarity deciding section 302 decides whether the person having no entry authority is accompanied by the person having the entry authority or not by using the criteria of (i) to (iv). Similarity deciding section 302 outputs, to decision result reporting section 103, a decision result indicating that an warning is unnecessary if it is decided that the person having no entry authority is accompanied by the person having the entry authority. On the other hand, similarity deciding section 302 outputs, to decision result reporting section 103, a decision result indicating that the warning is necessary if it is decided that the person having no entry authority is not accompanied by the person having the entry authority.

FIG. 24A shows an example of a person position and a reliability for an invader having no entry authority. FIG. 24B shows a first example of the person position and the reliability for a person having an entry authority. FIG. 24C shows a second example of the person position and the reliability for the person having the entry authority. FIG. 24D shows an example of monitoring area information to be stored in monitoring area DB 106. In the case in which the person having the entry authority in position measuring point data of FIG. 24B exists with respect to an invader in position measuring point data of FIG. 24A, it is decided that an warning is unnecessary by similarity deciding section 302. On the other hand, in the case in which the person having the entry authority in position measuring point data of FIG. 24C exists with respect to the invader in the position measuring point data of FIG. 24A, it is decided that the warning is necessary by similarity deciding section 302.

[3] Operation

Figure 25:
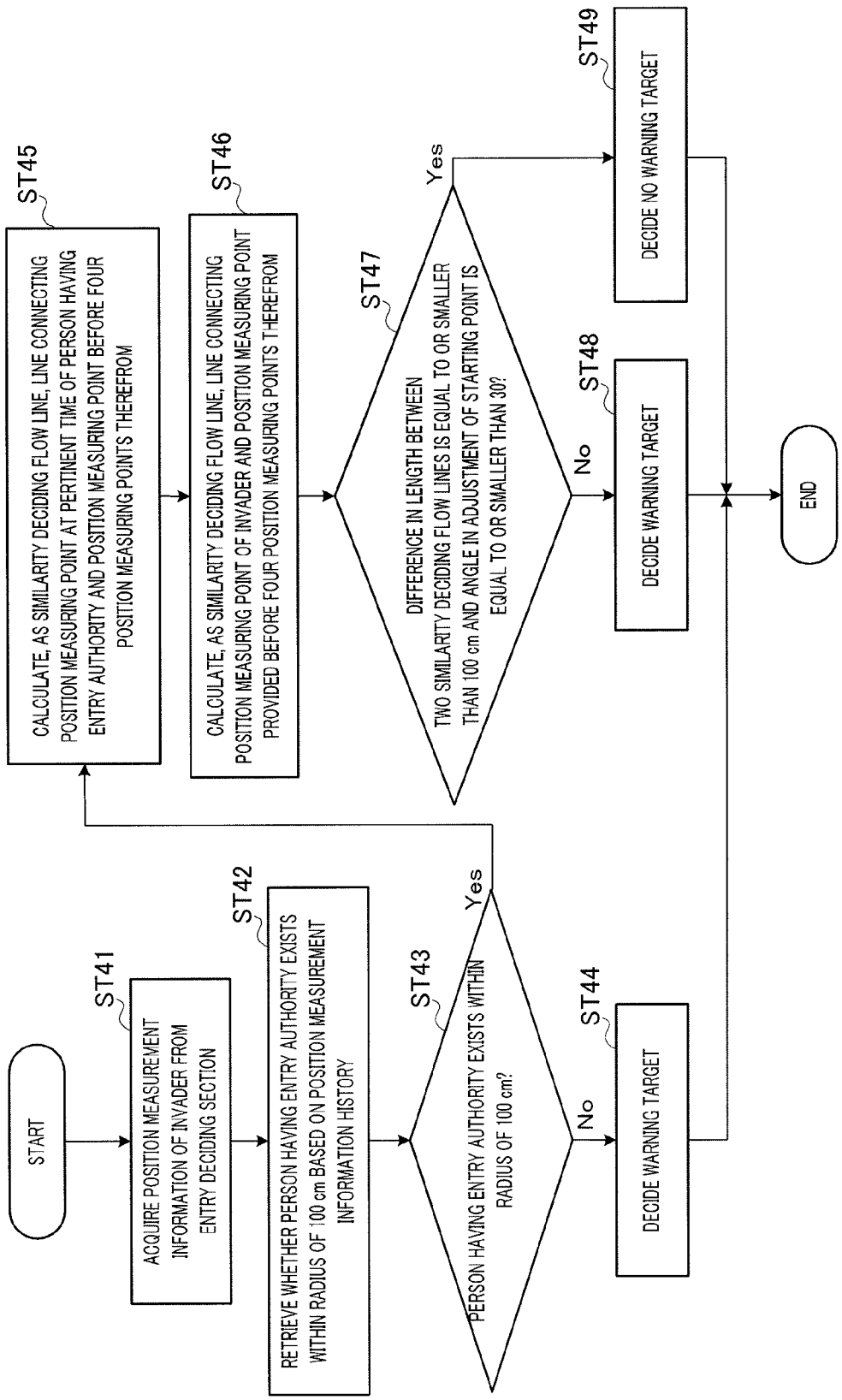
FIG. 25 is a flowchart for explaining an operation according to Embodiment 3.

Next, an operation according to the embodiment will be described. Monitoring apparatus 300 according to the embodiment has a feature in the processing of similarity deciding section 302. Therefore, a procedure for the processing of similarity deciding section 302 will be described with reference to FIG. 25. In the following, description will be given by taking, as an example, the case in which the criterion of (iv) is used.

In step ST41, similarly deciding section 302 acquires information about a position measuring point of a person having no entry authority that is decided to carry out an entry by entry deciding section 105. In step ST42, similarity deciding section 302 refers to position measurement information history DB 301, thereby retrieving whether or not a person having an entry authority exists within a range of a radius of 100 [cm] around the position measuring point acquired in step ST41, for example.

If similarity deciding section 302 decides that the person having the entry authority does not exist within the range of the radius of 100 [cm] in step ST43 (Step ST43: No), the processing proceeds to step ST44 in which similarity deciding section 302 decides that an invader is an warning target.

On the other hand, if similarity deciding section 302 decides that the person having the entry authority exists within the range of the radius of 100 [cm] (Step ST43: Yes), the processing proceeds to step ST45 in which similarity deciding section 302 calculates, as similarity deciding flow line L2, a line connecting a position measuring point at a pertinent time of the person having the entry authority and a position measuring point provided before four position measuring points therefrom (see FIG. 19). In step ST46, similarity deciding section 302 calculates, as similarity deciding flow line L1, a line connecting a position measuring point of the person having no entry authority and the position measuring point provided before four position measuring points therefrom (see FIG. 19).

In step ST 47, similarity deciding section 302 decides whether a difference in length between two similarity deciding flow lines L1 and L2 is equal to or smaller than 100 [cm] and an angle in an adjustment of a visual point is equal to or smaller than 30° or not. When a negative result is obtained in step ST47, the processing proceeds to step ST48 in which similarity deciding section 302 decides that an invader is an warning target. On the other hand, when a positive result is obtained in step ST47, the processing proceeds to step ST49 in which similarity deciding section 302 decides that the invader is not the warning target.

[4] Effect

As described above, according to the embodiment, also in the case in which similarity deciding section 302 is provided and it is decided that the target having no entry authority into monitoring area AR0 enters monitoring area AR0, an warning is not output if it is decided that the target is accompanied by the person having the entry authority into monitoring area AR0. Consequently, it is possible to actually prevent an unnecessary warning from being output.

[Embodiment 4]

[1] Principle

In the embodiment, an apparatus and a method which can meet the request of (2) (that is, to avoid an unnecessary entry decision, thereby decreasing a wasteful warning output) more fully are presented in the same manner as in Embodiments 2 and 3. In other words, in the embodiment, there is presented a monitoring apparatus capable of accurately deciding entering and/or leaving without fail and giving only a necessary and sufficient warning notice without an unnecessary warning notice.

Figure 26:
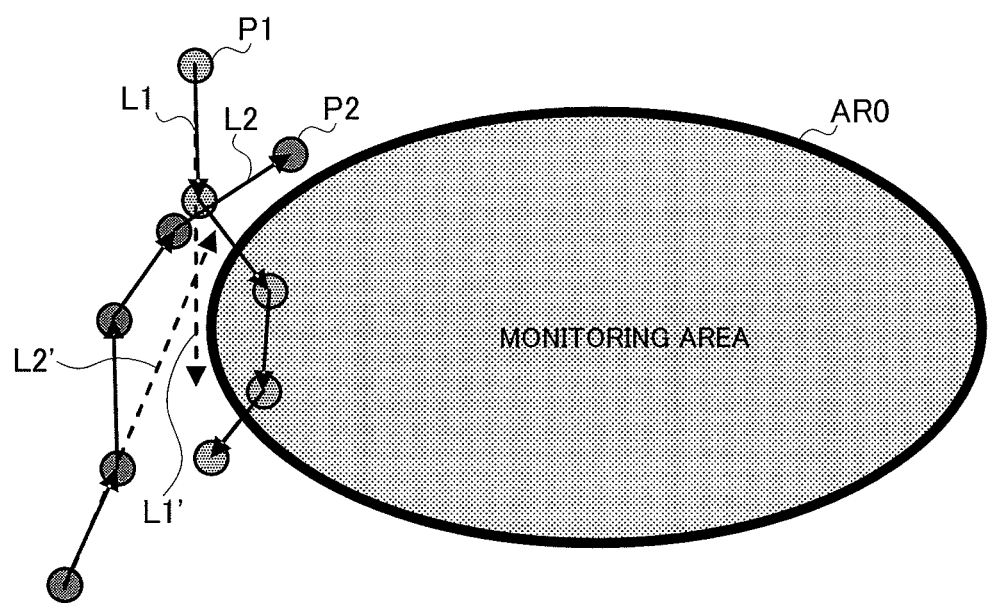
FIG. 26 is a diagram showing an image according to Embodiment 4.

FIG. 26 shows an image of the present embodiment. In the embodiment, also in the case in which it is detected that a person having no entry authority enters monitoring area AR0, an warning is not output if it is decided that entering is carried out to avoid a collision with another person.

A black circle indicated as the reference symbol P1 denotes a position measuring point of a person having no entry authority into monitoring area AR0 that is an entry detecting target. The reference symbol P2 denotes a position measuring point of another person that exists in the vicinity of the entry detecting target.

In the embodiment, a segment having a certain length from a last position measuring point (a line of direction in which an advance should be carried out if there is no collision) in an extended line of a flow line formed by connecting a last position measuring point from a position measuring point at which a person having no entry authority enters monitoring area AR0 and a further position measuring point provided before the last position measuring point is used as collision deciding line L1'. Referring to another person that exists in the vicinity of the entering person, similarly, collision deciding line L2' is formed based on a position measuring point at an identical time to a position measuring point which is a basis of the formation of collision deciding line L1'.

In the case in which collision deciding line L1' crosses collision deciding line L2', it is decided that the person having no entry authority enters monitoring area AR0 in order to avoid a collision and an warning is not output.

Figure 27A:
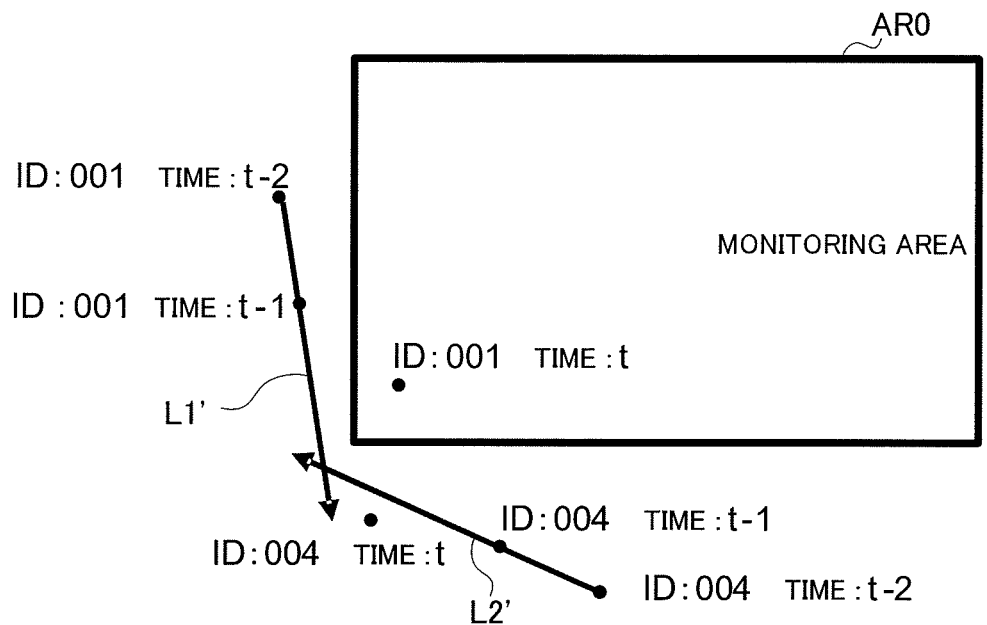
FIG. 27A is a diagram showing an example of an warning non-necessity and FIG. 27B is a diagram showing an example of an warning necessity.
Figure 27B:
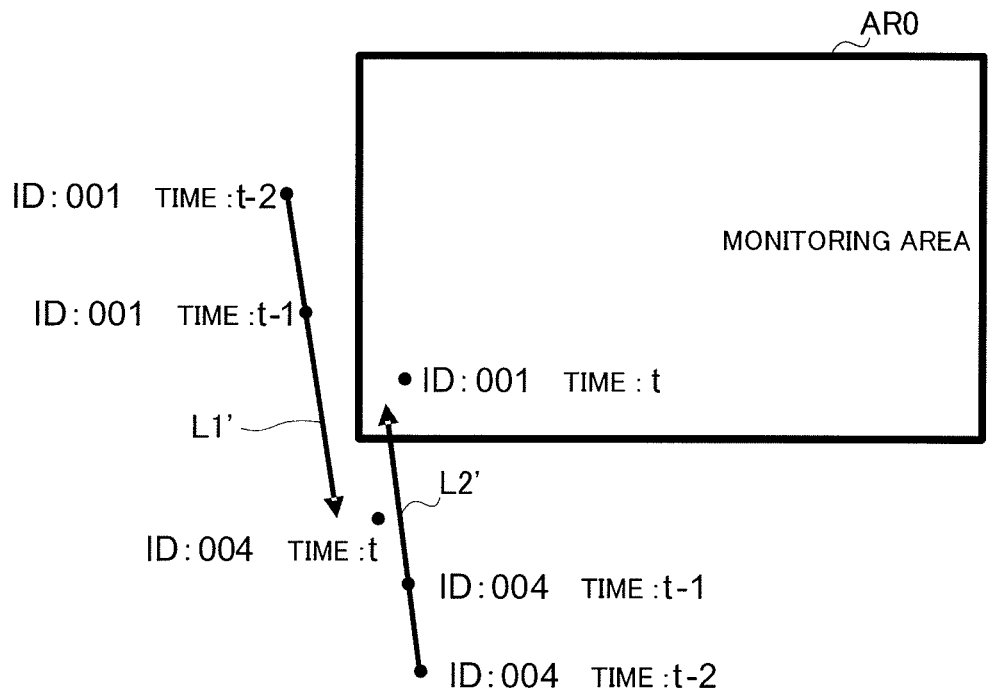

FIG. 27 shows an image for an warning necessity decision according to the embodiment. In FIG. 27A, collision deciding line L1' crosses collision deciding line L2'. Therefore, it is decided that entering is carried out to avoid a collision and an warning is unnecessary. On the other hand, in FIG. 27B, collision deciding line L1' does not cross collision deciding line L2'. Therefore, it is decided that entering is not carried out to avoid the collision and the warning is necessary.

Figure 28:
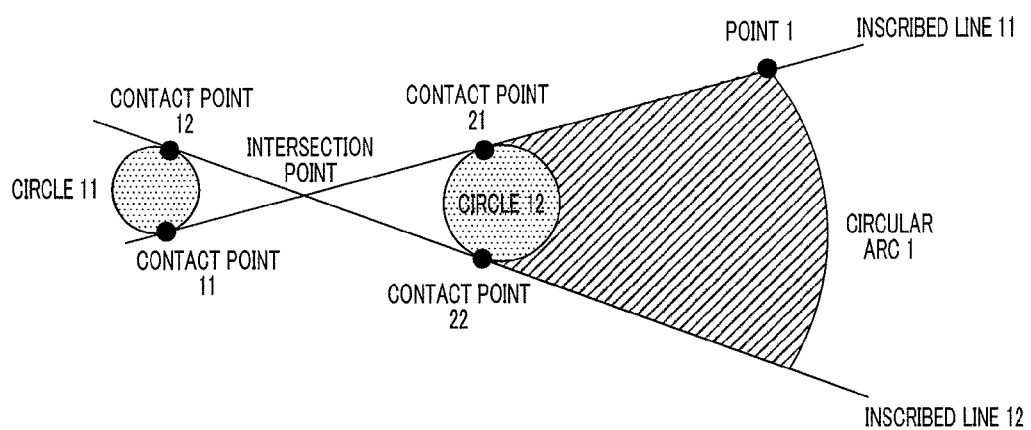
FIG. 28 is a diagram for explaining a collision decision which takes a reliability of a position measuring point into consideration.

The collision decision is not limited to one based on only the position measuring point but the collision decision may be made in consideration of a reliability of the position measuring point. The method will be described with reference to FIG. 28.

First of all, there are set circles 11 and 12 to be possible existing regions of position measuring points at times t1 and t2 of a deciding target (a person having no entry authority), and inscribed lines 11 and 12 of circles 11 and 12 are drawn. Contact points of inscribed lines 11 and 12 and circles 1 and 2 are defined as in the drawing.

A distance between contact point 11 and contact point 21 is represented by r, and a point on inscribed line 11 at a reverse side to contact point 11 at a distance of a×r ("a" is a constant) from contact point 21 is represented by point 1. "a" denotes a parameter representing a point of time where a collision is to be taken into consideration. If a value of "a" is small, only an immediately following collision is decided. If the value of "a" is great, succeeding collisions are also decided.

In a circular arc having a radius of "a distance of contact point 21 from intersection point+distance ar" around an intersection point of inscribed lines 11 and 12, a circular arc at a short side which is surrounded by inscribed lines 11 and 12 is set to be circular arc 1. In a circular arc formed by circular arc 1, inscribed line 11, inscribed line 12 and circle 12, a region surrounded by a longer circular arc divided by contact point 21 and contact point 22 is set to be a collision deciding region.

Referring to a position measuring point of a collision target person (another person that exists in the vicinity of an invader), similarly, a collision deciding region is obtained.

Referring to the collision deciding region of each of the deciding target and the collision target which is thus obtained, next, it is decided whether an overlap is caused or not. Thus, the collision decision is made. As a method for making the collision decision, it is also possible to employ a method for deciding whether an overlapping area is equal to or larger than a certain value in place of a method for deciding whether an overlapping region partially exists or not.

By making the collision decision considering a reliability for a position measuring point, thus, it is possible to precisely detect only an entry for avoiding a collision even if an error is made on each position measuring point. As a result, it is possible to prevent the decision that entering is carried out for avoiding a collision though entering is not intended for avoiding a collision due to a position measurement error. Therefore, it is possible to avoid an warning failure.

[2] Structure

Figure 29:
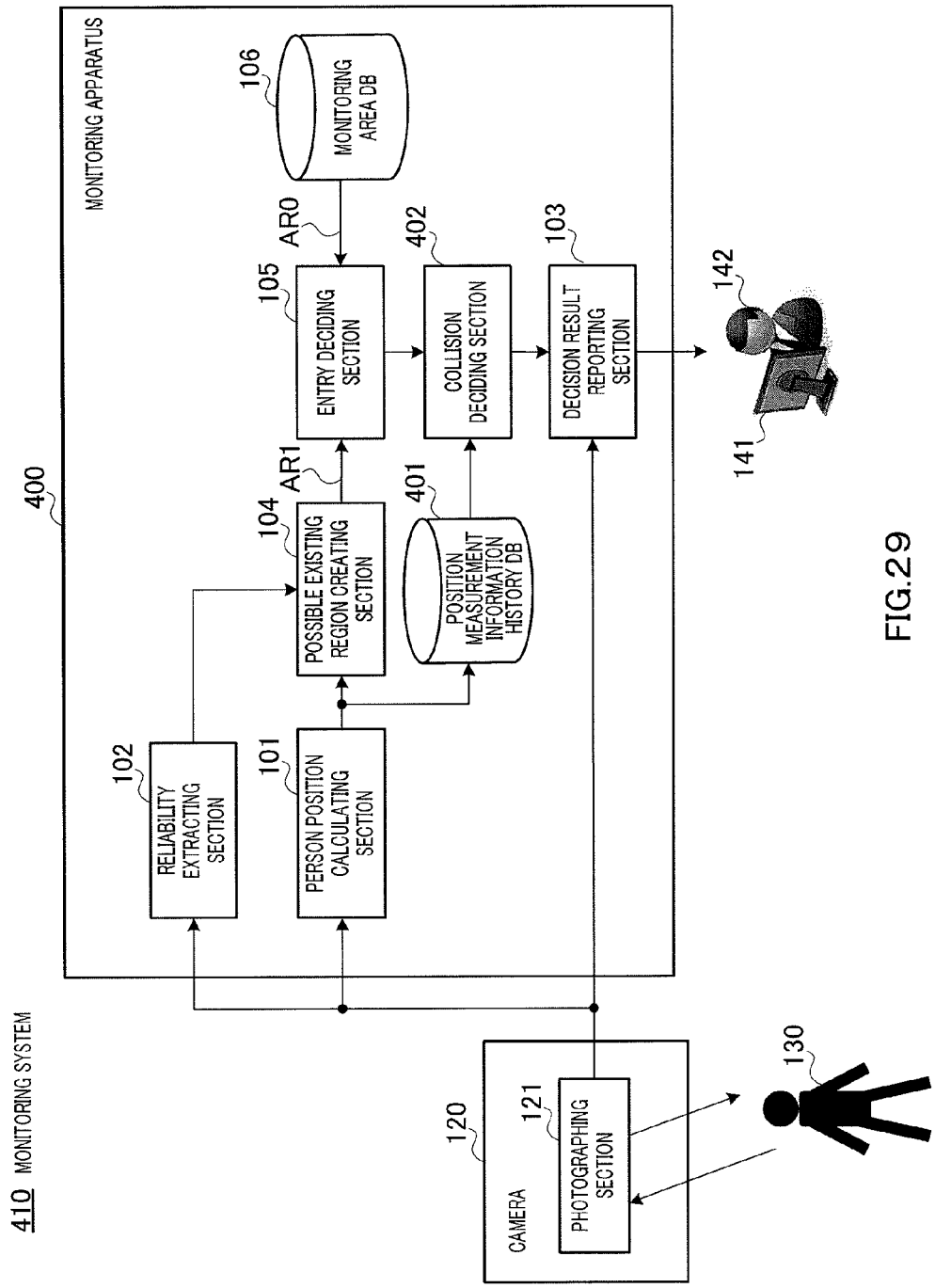
FIG. 29 is a block diagram showing a structure of a monitoring system according to Embodiment 4.

In FIG. 29 showing corresponding portions to FIG. 6 which have the same reference numerals, there is illustrated a structure of a monitoring system according to the embodiment. Monitoring system 410 has camera 120, monitoring apparatus 400 and monitor 141. Monitoring apparatus 400 has the same structure as that of apparatus 100 for detecting entering and/or leaving in FIG. 6 except that it has position measurement information history database (DB) 401 and collision deciding section 402.

Position measurement information history DB 401 holds position measurement information sent from person position calculating section 101 and offers a history of a position measurement to collision deciding section 402.

Collision deciding section 402 inputs, from entry deciding section 105, a position measuring point of a person decided to carry out an entry and having no entry authority, and furthermore, inputs a history of position measuring points of a person having an entry authority and a person having no entry authority from position measurement information history DB 401. Entry deciding section 105 decides whether an entry of the person having no entry authority is intended for avoiding a collision or not. If it is decided that entering is intended for avoiding a collision, collision deciding section 402 outputs, to decision result reporting section 103, a decision result indicating that an warning is unnecessary. On the other hand, if it is decided that entering is not intended for avoiding a collision, collision deciding section 402 outputs, to decision result reporting section 103, a decision result indicating that the warning is necessary.

FIG. 30A shows an example of a person position and a reliability for an invader having no entry authority. FIG. 30B shows a first example of a person position and a reliability for a person having an entry authority. FIG. 30C shows a second example of the person position and the reliability for the person having the entry authority. FIG. 30D shows an example of monitoring area information to be stored in monitoring area DB 106. In the case in which the person having the entry authority in the position measuring point data of FIG. 30B exists with respect to the invader in the position measuring point data of FIG. 30A, it is decided that the warning is unnecessary in collision deciding section 402. On the other hand, in the case in which the person having the entry authority in the position measuring point data of FIG. 30C exists with respect to the invader in the position measuring point data of FIG. 30A, it is decided that the warning is necessary in collision deciding section 402.

[3] Operation

Figure 31:
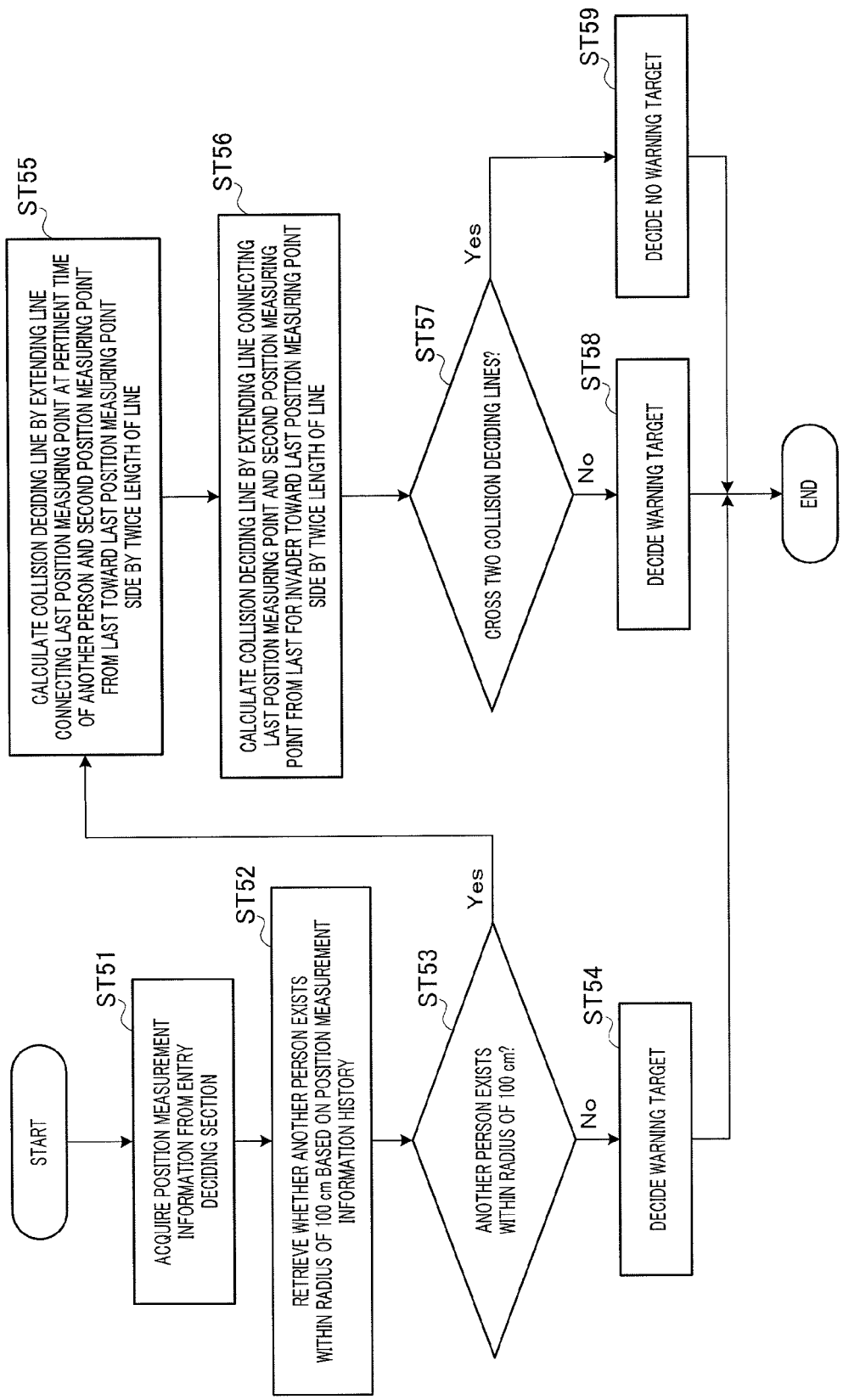
FIG. 31 is a flowchart for explaining an operation according to Embodiment 4.

Next, an operation according to the embodiment will be described. Monitoring apparatus 400 according to the embodiment has a feature in the processing of collision deciding section 402. Therefore, a processing procedure for collision deciding section 402 will be described with reference to FIG. 31.

In step ST51, collision deciding section 402 acquires information about a position measuring point of a person decided to carry out an entry by entry deciding section 105 and having no entry authority. In step ST52, collision deciding section 402 refers to position measurement information history DB 401 to retrieve whether another person exists within a range of a radius of 100 [cm] around the position measuring point acquired in step ST51, for example.

If collision deciding section 402 decides that another person does not exist within the range of the radius of 100 [cm] in step ST53 (Step ST53; No), the processing proceeds to step ST54 in which collision deciding section 402 decides that an invader is an warning target.

On the other hand, if collision deciding section 402 decides that another person exists within the range of the radius of 100 [cm] (Step ST53; Yes), the processing proceeds to step ST55 in which a line connecting a last position measuring point from a position measuring point at a pertinent time of another person and a second position measuring point from the last is extended toward the last position measuring point side by twice the length of the line, thereby calculating collision deciding line L2'. In step ST56, collision deciding section 402 extends a line connecting a last position measuring point of a person having no entry authority and a second position measuring point from the last toward the last position measuring point side by twice the length of the line, thereby calculating collision deciding line L1'.

In step ST57, collision deciding section 402 decides whether two collision deciding lines L1' and L2' cross each other or not. If a negative result is obtained in step ST57, the processing proceeds to step ST58 in which collision deciding section 402 decides that the invader is an warning target. On the other hand, if a positive result is obtained in step ST57, the processing proceeds to step ST59 in which collision deciding section 402 decides that the invader is not the warning target.

[4] Effect

As described above, according to the embodiment, there is provided collision deciding section 402. Also in the case in which it is decided that the target having no entry authority into monitoring area AR0 enters monitoring area AR0, an warning is not output if it is decided entering is carried out to avoid a collision with another person. Consequently, it is possible to actually prevent an unnecessary warning from being output.

Apparatus 100 for detecting entering and/or leaving, and monitoring apparatus 200, 300 and 400 described in Embodiments 1 to 4 can be executed by a general purpose computer such as a personal computer, and each processing included in apparatus 100 for detecting entering and/or leaving, and monitoring apparatus 200, 300 and 400 is implemented by reading a software program corresponding to a processing of each processing section stored in a memory of a computer and carrying out an execution processing through a CPU. Moreover, apparatus 100 for detecting entering and/or leaving, and monitoring apparatus 200, 300 and 400 may be implemented by a dedicated apparatus provided with an LSI chip which is compatible with each processing section.

Moreover, the apparatus for detecting entering and/or leaving and the monitoring apparatus according to the embodiments have a feature that entering and/or leaving of a target into and/or from monitoring area (specific area) AR0 can be detected with high precision, and a way of using a detection result is not limited to the way of using according to the embodiments. For instance, a notice of the entry into the specific area may be wirelessly given to a target decided to carry out the entry by entry deciding section 105 (for example, a portable wireless terminal). Furthermore, a content related to the specific area may be delivered to only the target decided to carry out the entry by entry deciding section 105 (for example, a portable wireless terminal), for instance. In addition, by providing the apparatus for detecting entering and/or leaving and the monitoring apparatus according to the embodiments in a portable terminal and displaying a detection result of entering and/or leaving and a monitoring result on a monitor of the portable terminal or making an warning sound corresponding to the detection result of entering and/or leaving and the monitoring result from the portable terminal, it is also possible to inform a user holding the portable terminal of entering and/or leaving into and/or from the specific area.

The disclosure of Japanese Patent Application No. 2009-055591, filed on Mar. 9, 2009, including the specification, drawings and abstract, is incorporated herein by reference in its entirety.

Industrial Applicability

The invention has an advantage that entering and/or leaving of a detecting target into and/or from a specific area can be detected with high precision also in the case in which a position measurement error is made, and is suitable for a monitoring system, for example.

The invention claimed is:

1. An apparatus for detecting entering and/or leaving comprising:
a position measurement reliability detector that detects a position measurement reliability of a position measurer;
a possible existing region determiner that determines a possible existing region in which a target subjected to a position measurement by the position measurer might exist based on a result of the position measurement which is obtained by the position measurer and the position measurement reliability obtained by the position measurement reliability detector; and
a decider that decides entering and/or leaving of the target into and/or from a specific area based on an overlap of the possible existing region and the specific area.

2. The apparatus for detecting entering and/or leaving according to claim 1, wherein the decider decides entering and/or leaving of the target into and/or from the specific area based on an overlapping area of the possible existing region and the specific area.

3. The apparatus for detecting entering and/or leaving according to claim 1, wherein the position measurement reliability detector obtains a probability density distribution of a position of the target as the position measurement reliability.

4. The apparatus for detecting entering and/or leaving according to claim 3, wherein the possible existing region determiner determines, as the possible existing region, a region in which a probability density in the probability density distribution is equal to or higher than a predetermined value or a region in which a cumulative probability in the probability density distribution is substantially equal to a predetermined value.

5. The apparatus for detecting entering and/or leaving according to claim 4, wherein the decider decides entering and/or leaving of the target into and/or from the specific area based on an integrated value of the probability density in an overlapping region between the specific area and the region in which the probability density in the probability density distribution is equal to or higher than the predetermined value or the region in which the cumulative probability in the probability density distribution is substantially equal to the predetermined value.

6. A monitoring apparatus comprising:
the apparatus for detecting entering and/or leaving according to claim 1;
a warning outputter that outputs a warning based on a result of a decision obtained by the decider;
a visible region obtainer that obtains a visible region of the target; and
a warning necessity decider that does not cause the warning outputter to output a warning for a first target when a position measuring position of the first target is included in a visible region of a second target, which is a separate target from the first target, even if it is decided that the first target enters the specific area by the decider.

7. The monitoring apparatus according to claim 6, wherein the visible region obtainer obtains the visible region based on a history of the position measurement of the target.

8. The monitoring apparatus according to claim 6, wherein:
the first target has no entry authority into the specific area; and
the second target has the entry authority into the specific area.

9. A monitoring apparatus comprising:
the apparatus for detecting entering and/or leaving according to claim 1;
a warning outputter that outputs a warning based on a result of a decision obtained by the decider;
a position measurement history recorder that records a history of a result of the position measurement obtained by the position measurer; and
a warning necessity decider that detects a relative situation of a first target and a second target from a history of a position measurement of the first target and a history of a position measurement of the second target which are recorded in the position measurement history recorder, and does not cause the warning outputter to output a warning for the first target when the relative situation of the first target and the second target satisfies a predetermined reference even if it is decided that the first target enters the specific area by the decider.

10. The monitoring apparatus according to claim 9, wherein the warning necessity decider decides whether the first target is accompanied by the second target by using the relative situation and the predetermined reference, and does not cause the warning outputter to output a warning for the first target when it is decided that the first target is accompanied by the second target.

11. The monitoring apparatus according to claim 10, wherein:
the first target has no entry authority into the specific area; and
the second target has the entry authority into the specific area.

12. The monitoring apparatus according to claim 9, wherein the warning necessity decider decides whether or not the first target might collide with the second target by using the relative situation and the predetermined reference, and does not cause the warning outputter to output a warning for the first target when it is decided that the first target and the second target might collide with each other.

13. The monitoring apparatus according to claim 12, wherein:
the first target has no entry authority into the specific area, and the second target has the entry authority into the specific area.

14. A method for detecting entering and/or leaving, comprising:
detecting a position measurement reliability;
determining a possible existing region in which a target subjected to a position measurement might exist based on a result of a position measurement and the detected position measurement reliability; and
deciding entering and/or leaving of the target into and/or from a specific area based on an overlap of the possible existing region and the specific area.

15. A non-transitory computer-readable recording medium storing a program that causes a computer to execute:
detecting a position measurement reliability;
determining a possible existing region in which a target subjected to a position measurement might exist based on a result of the position measurement and the detected position measurement reliability; and
deciding entering and/or leaving of the target into and/or from a specific area based on an overlap of the possible existing region and the specific area.

* * * * *